US011922766B2

(12) United States Patent
Pariseau

(10) Patent No.: US 11,922,766 B2
(45) **Date of Patent: *Mar. 5, 2024**

(54) GAMING MACHINE, CONTROL METHOD FOR A GAMING MACHINE, AND PROGRAM FOR GAMING MACHINE

(71) Applicant: Konami Gaming, Inc., Las Vegas, NV (US)

(72) Inventor: John Pariseau, Las Vegas, NV (US)

(73) Assignee: KONAMI GAMING, INC., Las Vegas, NV (US)

( * ) Notice: Subject to any disclaimer, the term of this patent is extended or adjusted under 35 U.S.C. 154(b) by 177 days.

This patent is subject to a terminal disclaimer.

(21) Appl. No.: 17/483,538

(22) Filed: Sep. 23, 2021

(65) Prior Publication Data

US 2022/0292924 A1 Sep. 15, 2022

Related U.S. Application Data

(63) Continuation of application No. 16/149,570, filed on Oct. 2, 2018, now Pat. No. 11,176,777.

(51) Int. Cl.
*G07F 17/32* (2006.01)

(52) U.S. Cl.
CPC ...... *G07F 17/3258* (2013.01); *G07F 17/3213* (2013.01); *G07F 17/3288* (2013.01)

(58) Field of Classification Search
CPC ............. G07F 17/3258; G07F 17/3213; G07F 17/3288
See application file for complete search history.

(56) References Cited

U.S. PATENT DOCUMENTS

| | | | |
|---|---|---|---|
| 8,821,289 B2 | 9/2014 | Green et al. |
| 9,230,402 B2 | 1/2016 | Green et al. |
| 10,360,752 B1 | 7/2019 | Riedel |
| 2011/0111826 A1 | 5/2011 | Baerlocher et al. |
| 2016/0055718 A1 | 2/2016 | Lyons et al. |
| 2018/0268659 A1 | 9/2018 | Chesworth et al. |

FOREIGN PATENT DOCUMENTS

| | | |
|---|---|---|
| JP | 2009-95454 A | 5/2009 |

*Primary Examiner* — Yingchuan Zhang
(74) *Attorney, Agent, or Firm* — Howard & Howard Attorneys PLLC

(57) ABSTRACT

A gaming machine provides a game and includes an operation unit, a display unit, a memory device and a game control unit. The operation unit receives an operation input. The display unit is configured to display a game screen including computer generated graphics. The memory device stores a game execution program including computer instructions for generating the game feature. The game control unit executes the game execution program to provide the game and is coupled to the operation unit, the display unit and the memory device. The game control unit includes a processor programmed to display a game structure on the game screen on the display unit. The game includes a feature award and a jackpot feature award. The jackpot feature award is awarded from a jackpot feature award pool. The jackpot feature award pool is funded through wagers and by when the feature award is awarded.

11 Claims, 17 Drawing Sheets

Software Block Diagram (1)

138

| Stop Position | Random Number Range |
|---|---|
| 1 | 1-50 |
| 2 | 51-100 |
| 3 | 101-150 |
| 4 | 151-200 |
| 5 | 201-250 |
| 6 | 251-300 |
| 7 | 301-350 |
| 8 | 351-400 |
| 9 | 401-450 |
| 10 | 451-500 |
| 11 | 501-550 |
| 12 | 551-600 |
| 13 | 601-650 |
| 14 | 651-700 |
| 15 | 701-750 |
| 16 | 751-800 |
| 17 | 801-850 |
| 18 | 851-900 |
| 19 | 901-950 |
| 20 | 951-1000 |

FIG. 13

GAMING MACHINE, CONTROL METHOD FOR A GAMING MACHINE, AND PROGRAM FOR GAMING MACHINE

CROSS-REFERENCE TO RELATED APPLICATION

This is a continuation of U.S. patent application Ser. No. 16/149,570, filed Oct. 2, 2018, the disclosure of which is hereby incorporated by reference in its entirety.

TECHNICAL FIELD

The present invention relates to a gaming machine, a control method for a gaming machine, and a program for a gaming machine.

BACKGROUND ART

A gaming machine represented by a slot machine is highly popular among casino customers as a device that provides gaming that is easy to enjoy, and recent statistics report that sales from gaming machines account for the majority of casino earnings. Initial slot machines were simple devices, wherein an inserted coin is received, a configured reel rotates and stops mechanically according to a handle operation, and a win or a loss is determined by a combination of symbols stopped on a single pay line. However, recent gaming machines, such as mechanical slot machines driven by a highly accurate physical reel via a computer-controlled stepping motor, video slot machines that display a virtual reel on a display connected to a computer, and various gaming machines that apply similar technology to other casino games are quickly advancing. For the manufacturers that develop these gaming machines, an important theme is to provide an attractive game that strongly attracts casino customers as players and improves the functionality of the gaming machine.

SUMMARY OF INVENTION

In one aspect of the present invention, a gaming machine having an operation unit, a display unit, a memory device and a game control unit is provided. The operation unit is configured to receive an operation input of a player. The display unit is configured to display a game screen including computer generated graphics. The memory device stores a game execution program and a data configuration structure. The game execution program includes computer instructions for generating a game. The data configuration structure represents a jackpot feature award pool. The game control unit executes the game execution program to provide the game to the player. The game control unit is coupled to the operation unit, the display unit and the memory device includes a processor. The processor is programmed to allow the player to establish a wager on the game, add a portion of the wager to the jackpot feature award pool, randomly establish an outcome of an instance of the game and display a game structure on the game screen on the display unit. The game structure displays the randomly determined outcome of the instance of the game. The processor is further programmed to award the player a game award as a function of the outcome of the instance of the game, detect a first trigger condition associated with the instance of the game, and in response to detecting the first trigger award: (1) award the player a first feature award and (2) add a first feature contribution amount to the jackpot feature award pool. The processor is further programmed to detect a jackpot feature trigger condition associated with the instance of the game, and in response to detecting the jackpot feature trigger condition, award the player at least a portion of the jackpot feature award pool.

In another aspect of the present invention, a control method for a gaming machine is provided. The gaming machine includes an operation unit, a display unit, a memory device and a game control unit. The operation unit is configured to receive an operation input of a player. The display unit is configured to display a game screen including computer generated graphics. The memory device stores a game execution program and a data configuration structure. The game execution program includes computer instructions for generating a game. The data configuration structure represents a jackpot feature award pool. The game control unit executes the game execution program to provide the game to the player. The game control unit includes a processor programmed to: allow the player to establish a wager on the game, add a portion of the wager to the jackpot feature award pool, randomly establish an outcome of an instance of the game and display a game structure on the game screen on the display unit. The game structure displays the randomly determined outcome of the instance of the game. The processor is further programmed to award the player a game award as a function of the outcome of the instance of the game; detect a first trigger condition associated with the instance of the game, and in response to detecting the first trigger award: (1) award the player a first feature award and (2) add a first feature contribution amount to the jackpot feature award pool. The processor is further programmed to detect a jackpot feature trigger condition associated with the instance of the game, and in response to detecting the jackpot feature trigger condition, award the player at least a portion of the jackpot feature award pool.

In a further aspect of the present invention, one or more non-transitory computer-readable storage media, having computer-executable instructions embodied thereon is provided. When executed by a processor, the computer-executable instructions cause the processor to receive an operation input of a player on an operation unit, allow the player to establish a wager on the game, add a portion of the wager to the jackpot feature award pool, randomly establish an outcome of an instance of the game and display a game structure on a game screen on a display unit. The game structure displays the randomly determined outcome of the instance of the game. The processor awards the player a game award as a function of the outcome of the instance of the game, detects a first trigger condition associated with the instance of the game, and in response to detecting the first trigger award: (1) awards the player a first feature award and (2) adds a first feature contribution amount to the jackpot feature award pool. The processor further detects a jackpot feature trigger condition associated with the instance of the game, and in response to detecting the jackpot feature trigger condition, awards the player at least a portion of the jackpot feature award pool.

In still another aspect of the present invention, a mobile computing device is provided. The mobile computing device includes a touch display unit, a memory device, and a processor. The touch display unit is configured to display a game screen including computer generated graphics. The memory device stores a game execution program including computer instructions for generating the game feature. The game control unit executes the game execution program to provide the game feature. The game control unit is coupled to the touch display unit and the memory device. The game control unit includes a processor programmed to: allow the player to establish a wager on the game, add a portion of the wager to the jackpot feature award pool, randomly establish an outcome of an instance of the game and display a game structure on the game screen on the display unit. The game structure displays the randomly determined outcome of the instance of the game. The processor is further programmed to award the player a game award as a function of the outcome of the instance of the game; detect a first trigger condition associated with the instance of the game, and in response to detecting the first trigger award: (1) award the player a first feature award and (2) add a first feature contribution amount to the jackpot feature award pool. The processor is further programmed to detect a jackpot feature trigger condition associated with the instance of the game, and in response to detecting the jackpot feature trigger condition, award the player at least a portion of the jackpot feature award pool.

BRIEF DESCRIPTION OF DRAWINGS

FIG. 13 is an exemplary illustration of a computer program data file that may be used by the gaming machine shown in FIGS. 1A-1B and the server system shown in FIGS. 11 and 12, according to embodiments of the present invention.

Corresponding reference characters indicate corresponding parts throughout the drawings.

DETAILED DESCRIPTION OF EMBODIMENTS

Figure 1A:
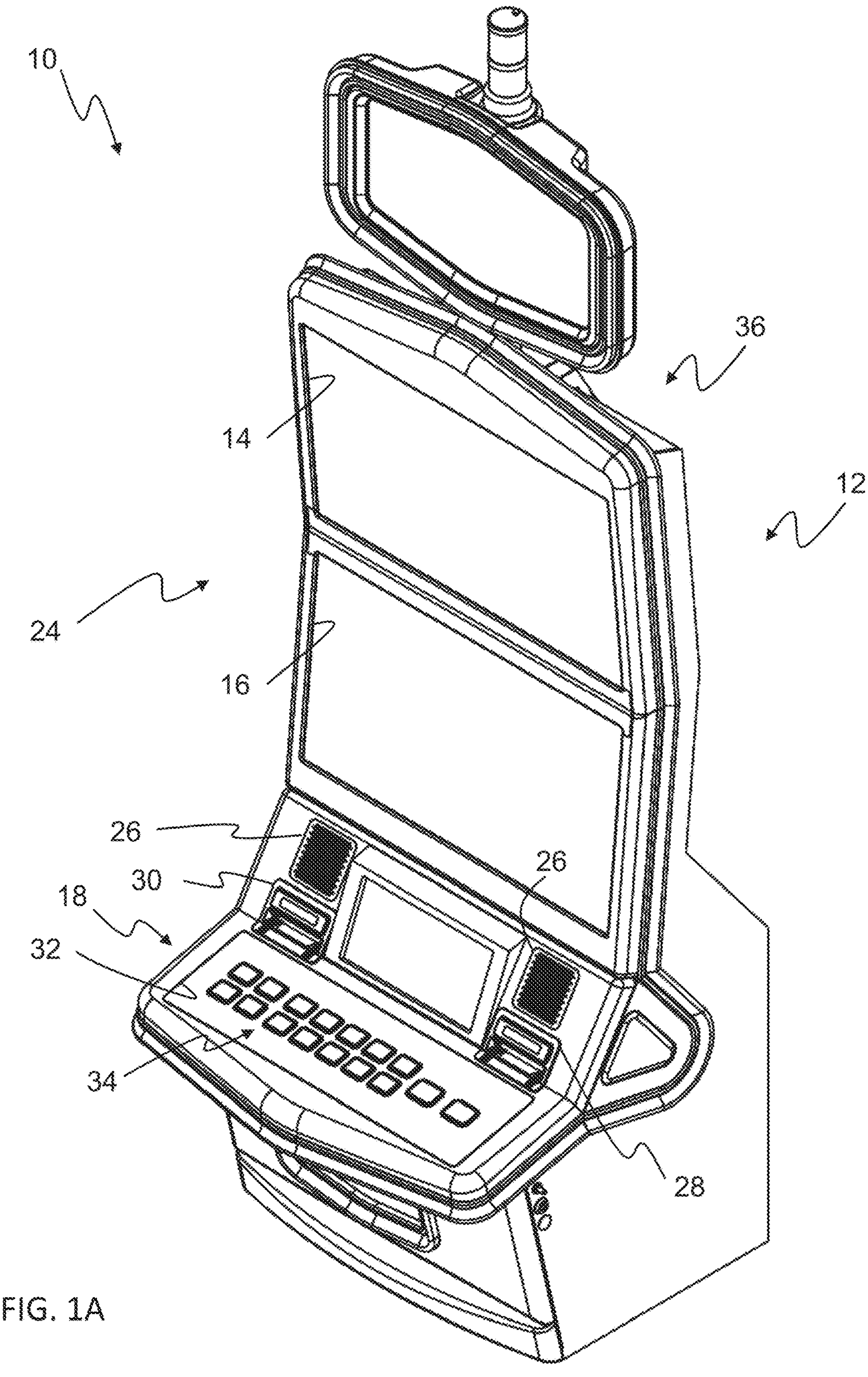
FIG. 1A is a perspective view of the gaming machine, according to the first embodiment.

A gaming machine, according to an embodiment of the present invention, referencing the attached figures is described in detail below. Further, duplicated descriptions will be omitted for identical attached symbols in identical or corresponding parts in each figure. With reference to the drawings, and in operation, the present invention is directed towards a gaming machine, a control method for a gaming machine, and a program for a gaming machine and/or mobile computing device that provides a game feature to a player. In one aspect of the present invention, the gaming machine may provide a primary game. The game feature may be provided as a game feature provided during or by the primary game or the game feature may be provided as a bonus game triggered during the primary game.

The present invention improves the functionality of existing gaming machines by providing a game execution program including computer instructions executed by a processor to operate a game that may include a primary game and/or game feature that displays a game structure on a game screen on a display unit (see below). As discussed in detail below, the game structure may include a grid comprised of a plurality of cells. During the game, symbols are randomly determined and displayed in the cells. The symbols displayed in the cells comprise an outcome associated with the game.

In one embodiment, the game feature, includes at least one feature award and a jackpot feature award. As discussed below, the player may make a wager on the primary game. The primary game is played and an outcome determined. The player may be awarded a primary game award as a function of the outcome of the primary game and a predetermined paytable. If a first trigger condition has occurred, the player may be awarded the feature award. In addition, if a jackpot feature trigger condition has occurred, the player may be awarded the jackpot feature award. In one embodiment, the feature award is a predetermined amount. The jackpot feature award is awarded from a jackpot feature award pool. Contributions are made to the jackpot feature award (1) as a percentage of wagers made on the primary game and (2) an additional amount, i.e., a contribution amount, when the feature award is awarded to the player.

In one aspect of the present invention, the awarding of the feature award or the awarding of the jackpot feature award may be triggered during the primary game. In one embodiment the awarding of the feature award or the jackpot feature award is triggered with the appearance of a predetermined number of a respective predetermined symbol in an outcome of the primary game (see below). In another embodiment, the trigger of the game feature may be a mystery trigger. For instance, a portion of each additional wager may be added to one or more pools. In one embodiment, the game feature may be triggered when the amount in one of the pools exceeds a predetermined or random threshold. In some instances, the feature award or jackpot feature award will be awarded to the player whose contribution to the pool caused the pool to exceed the threshold. The trigger may be any suitable triggering condition.

With reference to FIGS. 1A-12 a gaming machine, system and mobile computing device for providing a primary game and/or the game feature in one embodiment of the present invention are shown.

Figure 1B:
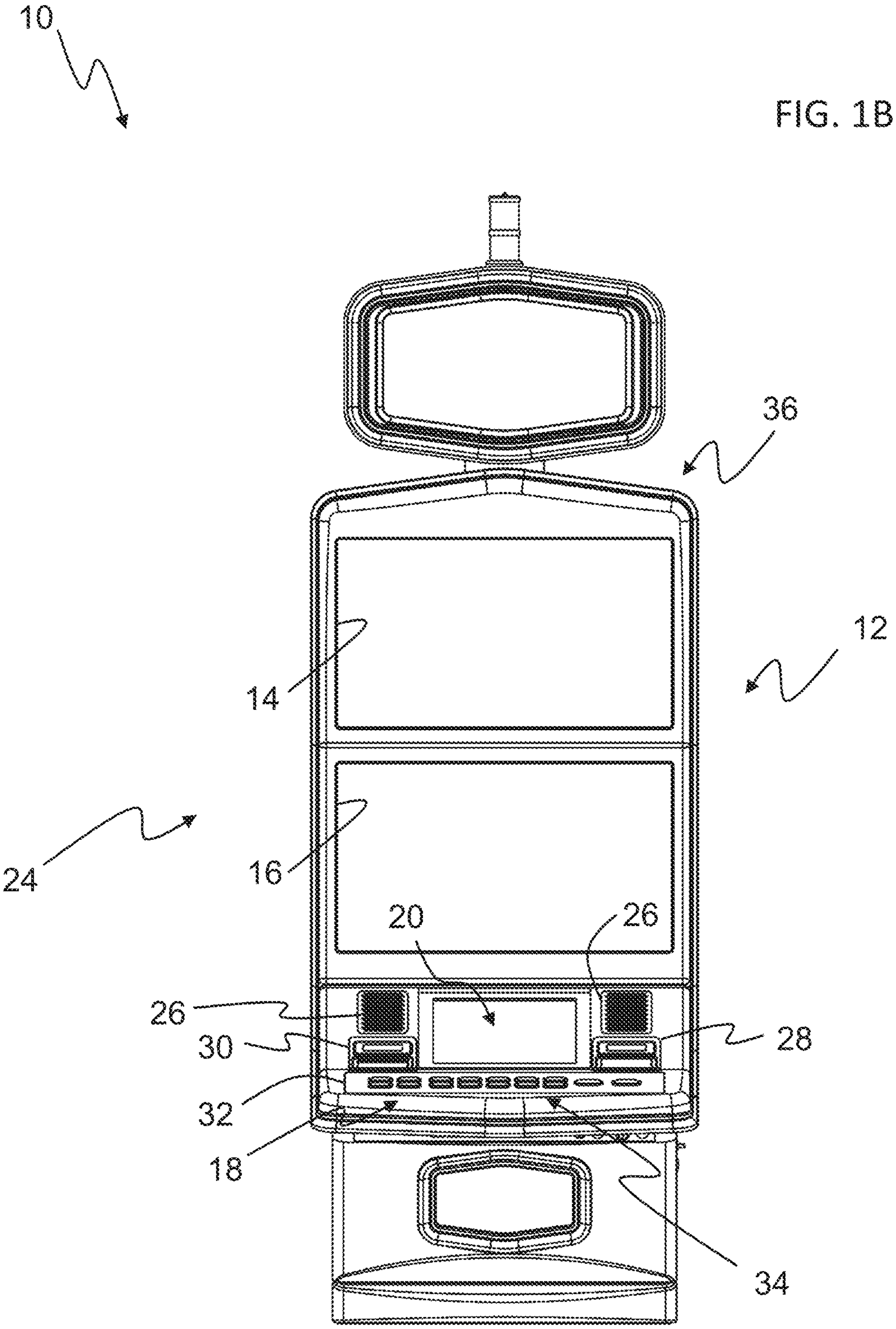
FIG. 1B is a front view of the gaming machine of FIG. 1A.

The gaming machine according to the present embodiment, receives a predetermined game value (or wager) from the player, generates a game result (or outcome), and provides a payout to the player according to the game result and one or more pay tables. FIG. 1A and FIG. 1B are a perspective view and a front view, respectively, of a gaming machine 10, according to the present embodiment. As shown in FIGS. 1A and 1B, this gaming machine 10 provides a cabinet 12 providing an upper display 14, a lower display 16, and a control panel 18 and may also house a player tracking or ranking unit 20. The cabinet 12 also houses a game control unit 22 (see FIG. 2) that controls each part (see below). The control unit 22 also implements a random number generator (RNG) that is used during operation of the game. Each configuration is described below.

The upper display 14 and the lower display 16 may be flat panel display devices, such as both liquid crystal display devices and organic EL display devices and the like, and by controlling via each control unit 22, the display area mentioned below functions as a display unit 24 provided to the player.

Speakers 26 are provided on the left and right of the cabinet 12, and by controlling via the control unit 22, sound is provided to the player. On the control panel 18, a bill/ticket identification device 28, a printer device 30, and an operation unit 32 are provided.

The player tracking unit 20 may be housed on the center of the front surface of the cabinet 12 below the lower display 16. The player tracking unit 20 has a card reader that recognizes a player identification card, a display that presents data to the player, and a keypad that receives input by the player. This type of player tracking unit 20 reads information recorded on the player identification card inserted by the player into the card reader, and displays the information and/or information acquired by communicating with the external system on the display, by cooperatively operating with the control unit 22 mentioned below or an external system. Further, input from the player is received by the keypad, the display is changed according to the input, and communication with the external system is carried out as necessary.

The bill/ticket identification device 28 is disposed on the control panel 18 in a state where the insertion opening that a bill/ticket is inserted into is exposed, an identification part that identifies a bill/ticket by various sensors on the inside of the insertion opening is provided, and a bill/ticket storage part is provided on the outgoing side of the identification part. The bill/ticket identification device 28, receives and identifies bills/tickets (including vouchers and coupons) that are the game value as a game executing value, and notifies the control unit 22 mentioned below.

The printer device 30 is disposed on the control panel 18 in a state where the ticket output opening that a ticket is output from is exposed, a printing part that prints predetermined information on a printing paper on the inside of the ticket output opening is provided, and a housing part that houses the printing paper inside the paper inlet side of the printing part is provided. The printer device 30, under the control of the control unit 22 mentioned below, prints information on paper and outputs a ticket according to credit payout processing from the gaming machine 10. The output ticket can use the payout credit as game play by being inserted into the bill/ticket identification device 28 of another gaming machine, or, can be exchanged for cash by a kiosk terminal inside of the casino or a casino cage.

The operation unit 32 receives the operation of the player. The operation unit 32 includes a group of buttons 34 that receives various instructions from the player on the gaming machine 10. The operation unit 32, for example, may include a spin button and a group of setting buttons. The spin button receives an instruction to start (start rotating the reel) an instance of the game. The group of setting buttons 34 includes a group of bet buttons, a group of line-designation buttons, a max bet button, and a payout button and the like. The group of bet buttons receives an instruction operation regarding the bet amount of credits (bet number) from the player. The group of line-designation buttons receive an instruction operation that designate a pay line subjected to a line judgment below from the player. The max bet button receives an instruction operation regarding the bet of the maximum amount of credits that can be bet at one time from the player. The payout button receives an instruction operation instructing a credit payout accumulated in the gaming machine 10. The gaming machine 10 also includes illumination devices 36 that provides decorative lighting to the gaming machine 10.

In one embodiment, referring to FIGS. 1A and 1B, the control panel 18 includes a plurality of user input devices that may include an acceptor device which accepts media associated with a monetary value to establish a credit balance, a validator configured to identify the physical media, a cash-out button actuatable to cause an initiation of a payout associated with the credit balance. The acceptor device may include a touchscreen display associated with the display unit 24 and/or the player tracking unit 20, the paper money/ticket identification device 28, the operation unit 32, the player tracking unit 20, a coin slot, a ticket in ticket out (TITO) system, a bill acceptor, and/or any suitable device that enables the gaming machine 10 to receive media associated with a monetary value and establish a credit balance for use in playing the gaming machine 10. In one embodiment, the acceptor device may be configured to receive physical media such as, for example, a coin, a medal, a ticket, a card, a boll, currency, and/or any suitable physical media that enables the gaming machine 10 to function as described herein. The acceptor device may also be configured to accept virtual media such as, for example, a player tracking account, a virtual credit balance, reward points, gaming credits, bonus points, and/or any suitable virtual media that enables the gaming machine 10 to function as described herein.

For example, in one embodiment, the coin slot may include an opening that is configured to receive coins and/or tokens deposited by the player into the gaming machine 10. The control unit 22 converts a value of the coins and/or tokens to a corresponding amount of gaming credits that are used by the player to wager on games played on the gaming machine 10. The bill acceptor may include an input and output device that is configured to accept a bill, a ticket, and/or a cash card into the bill acceptor to enable an amount of gaming credits associated with a monetary value of the bills, ticket, and/or cash card to be credited to the gaming machine 10. In one embodiment, the bill acceptor also includes a printer (not shown) that is configured to dispense a printed voucher ticket that includes information indicative of an amount of credits and/or money paid out to the player by the gaming machine 10 during a gaming session. The voucher ticket may be used at other gaming devices, or redeemed for cash, and/or other items as part of a casino cashless system.

Figure 2:
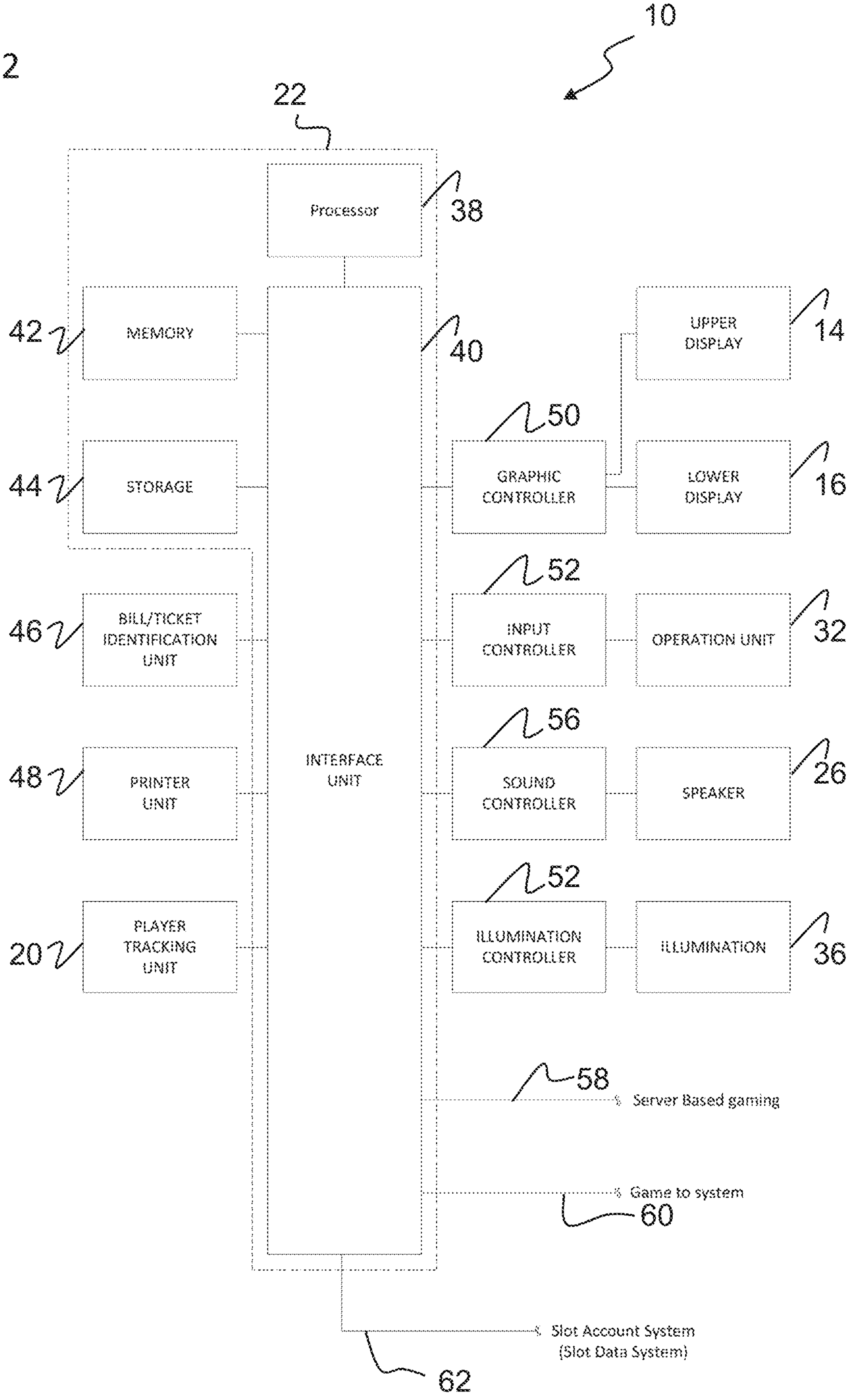
FIG. 2 is a functional block diagram of the gaming machine in FIG. 1A.

With reference to FIGS. 1A, 1B, and 2, further on the inside of cabinet 12, a control board equipped with a central processing unit 38 (abbreviated as CPU below) including a processor that configures the control unit 22, an interface unit (or part) 40, a memory 42 and a storage 44 and the like are incorporated. The control board is configured so that communication is possible through the interface unit 40 and each of the components equipped on the cabinet 12, controls the operation of each part by executing the program recorded in the memory 42 or the storage 44 of the CPU 38, and provides a game to the player. The function of the CPU 38 is to execute and display the game on the displays 14, 16 of the gaming machine 10.

FIG. 2 shows a functional block diagram of the gaming machine 10, according to the present embodiment. The gaming machine 10 provides the control unit 22. The control unit 22 is configured as the interface unit 40 including a chip set providing communication functions of the CPU 38, a memory bus connected to a CPU 38, various expanding buses, serial interfaces, USB interfaces, Ethernet (registered trademark) interfaces and the like, and a computer unit where the CPU 38 provides the addressable memory 42 and the storage 44 through the interface unit 40. The memory 42 can be configured to include RAM that is a volatile storage medium, ROM that is a nonvolatile storage medium, and EEPROM that is a rewritable nonvolatile storage medium. The storage 44 provides the control unit 22 as an external storage device function, can use reading devices such as a memory card that is a removable storage medium, and a magneto optical disk and the like, and can use hard disks.

On the interface unit 40, in addition to the CPU 38, the memory 42, and the storage 44, a bill/ticket identification unit controller 46, a printer unit controller 48, the player tracking unit 20, a graphic controller 50, an input controller 52, and a sound controller 54 are connected. That is, the control unit 22 is connected to the operation unit 32 through the input controller 52, and connected to the upper display 14 and/or the lower display 16 through the graphic controller 50. Further, when illumination devices 36 that provides decorative lighting to the gaming machine 10 is provided, the illumination is controlled under the control of the control unit 22 on the interface unit 40, and an illumination controller 56 that controls the illumination devices 36 to provide a decorative lighting effect may be connected.

The control unit 22, which includes memory 42 and storage 44, controls each part by executing a program stored in the memory 42 and the storage 44, and provides a game to the player. Here, for example, the memory 42 and storage 44 may be configured to store a program and data of an operating system and subsystem that provide the basic functions of the control unit 22 to the EEPROM of the memory 42, and stores a program and data of an application that provides a game to the storage 44. According to such a configuration, it can be easy to change or update a game by replacing the storage 44. Further, the control unit 22 may be a multiprocessor configuration that has a plurality of CPUs.

Each block connected to the control unit 22 is described below. The bill/ticket identification unit controller 46 operates the bill/ticket identification device 28 to receive bills/tickets in the insertion opening, and notifies the control unit 22 of identifying information corresponding to the assortment of bills or the payout processing of credits. The bill/ticket identification unit controller 46 notifies the information to the control unit 22, and the control unit 22 increases the usable credit amount inside of the game according to the notified content. The printer unit controller 48 corresponds to the printer device 30, and under the control of the control unit 22 that receives an operation of the payout button of the group of setting buttons 34, information corresponding to the credit payout processing from the gaming machine 10 is printed and output on a printed ticket.

The player ranking (or tracking unit) unit 20 cooperatively operates with the control unit 22, and sends and receives information and the like of the player from the casino management system. The graphic controller 50 controls the upper display 14 and the lower display 16, under the control of the control unit 22, and displays a display image that includes various graphic data. The sound controller 54 drives the speakers 26 under the control of the control unit 22, and provides various sounds such as an announcement, sound effects, BGM and the like.

Further, the interface unit 40, has various communication interfaces for communicating with the exterior of the gaming machine 10, for example the interface unit 40 can communicate with an external network by Ethernet 58, 60, and an external slot information system or slot account system 62. In the present embodiment, one example shows when there is communication between a well-known server side gaming network (Server Based Gaming of FIG. 2), a G2S network (Game to System of FIG. 2), and a slot information system (Slot Data System of FIG. 2), respectively.

Figure 3:
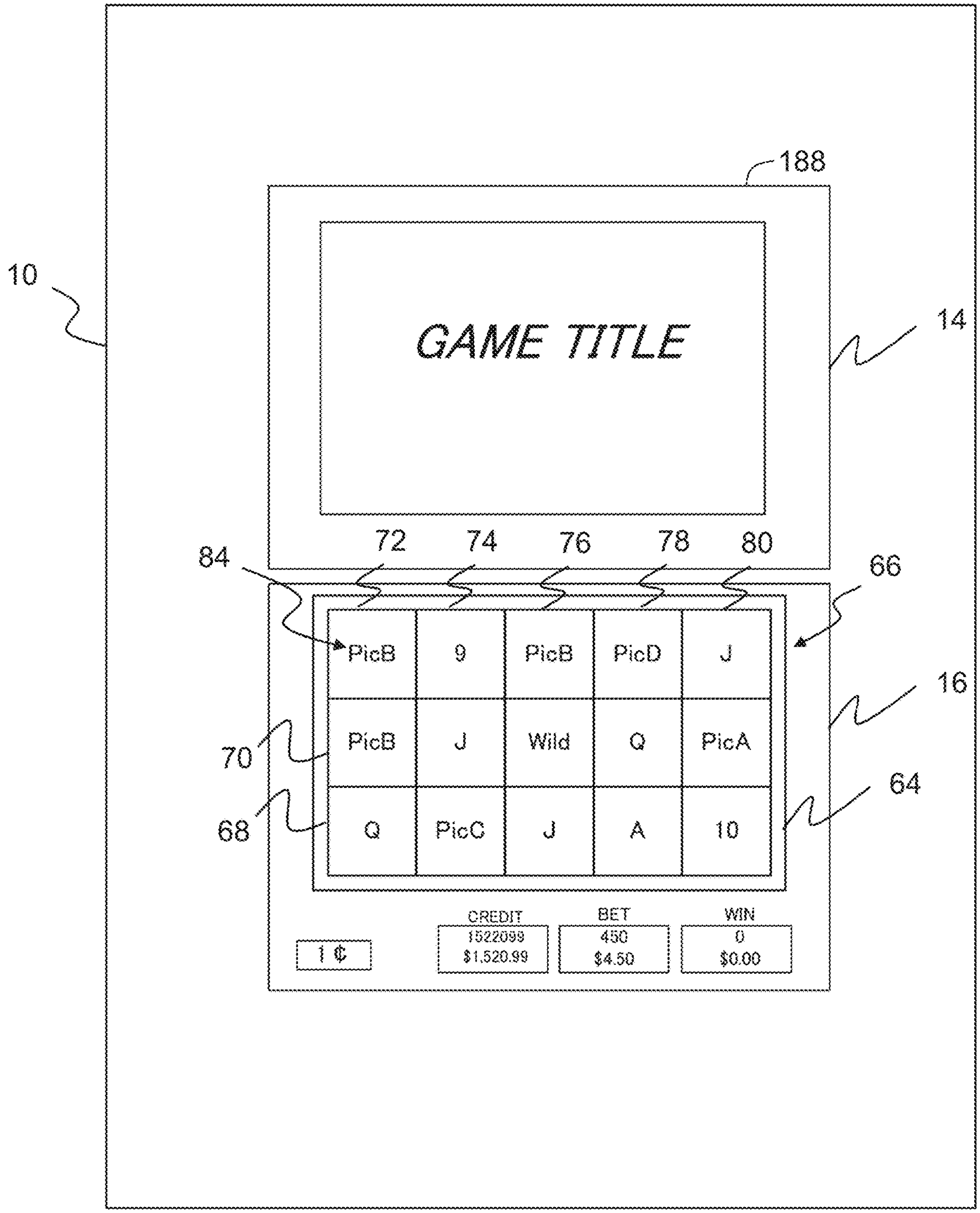
FIG. 3 is a first diagrammatic illustration of a display area of the gaming machine in FIGS. 1A-2, according to an embodiment of the present invention.

FIG. 3 schematically shows a display area 64 provided by the gaming machine 10. Such a display area 64 is displayed on the display unit 24 (the upper display 14 and/or the lower display 16) by the control unit 22 executing a predetermined program. In the illustrated embodiment, the display area 64 is displayed on the lower display 16. For instance, as shown, during a game, the upper display 14 may be utilized to display game related information, e.g., game title information and/or graphics.

As discussed above, in one aspect of the present invention, the gaming machine 10 provides a primary game. In one embodiment the primary game is a video slot game using a plurality of virtual reels 66. The video slot game utilizes a display structure, shown as a grid 68 in the display area 64. The illustrated embodiment shows the state of displaying the display area 64 in the lower display 16. As shown in FIG. 3, the display area 64 includes the grid 68 for displaying symbols. By using such a display area, the gaming machine 10 of the present embodiment operates as a slot machine that pays a payout according to a winning combination of symbols displayed on the display area 64.

The display unit 24 displays a plurality of symbols in the grid 68. The grid 68 has a plurality of rows (r) and columns (c). The grid 68 is configured by a plurality of cells 70 that are the stop position of symbols.

With reference to FIG. 3, the grid 68 may be displayed on the lower display 16. The upper display 14 may be used to display animations and/or game identifying information during the game and/or during an attract mode. Further, the display unit 24 can display a decorative area, and an area that displays credit amount, bet number, and a credit amount obtained by winning (WIN number) and the like, outside of the grid 68. On each of the plurality of cells 70 of the display area 64, one symbol is stopped and displayed.

Figure 4:
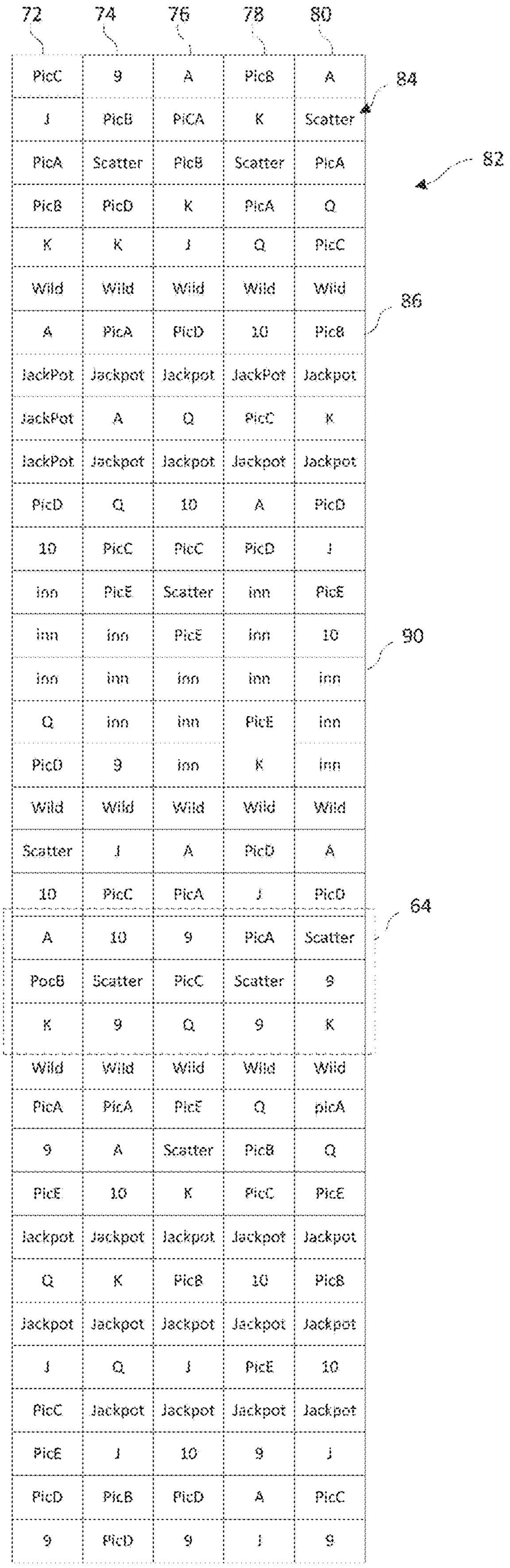
FIG. 4 is an illustration of exemplary virtual reel strips with symbol arrangements showing the order of symbols displayed on the display area, according to an embodiment of the present invention.

On each cell 70 of the grid 68, as shown in FIGS. 3 and 4, a symbol is displayed based on the symbol arrangement of virtual reels 66 including virtual reel strips 72, 74, 76, 78, and 80 configured as a virtual reel set 82. That is, the cells 70 of the grid 68 correspond to the virtual reel strips 72 to 80 by column, and the symbols disposed on predetermined parts of each virtual reel strip 72 to 80 are displayed. Furthermore, by moving (scrolling or spinning) each symbol by column based on the symbol arrangement of the virtual reel strips 72 to 80, the symbols displayed in the cells 70 of the grid 68 change, and by stopping the movement (scrolling or spinning) by columns, the symbols are stopped. Here, the virtual reel strips 72 to 80 are data where the control unit 22 uses a program having the memory 42 or the storage 44, and data showing the symbol arrangement (i.e., the order of symbols on each reel strip) regulated by each cell column. Further, the virtual reel set 82 is a general term for such virtual reel strips 72 to 80.

Figure 5:
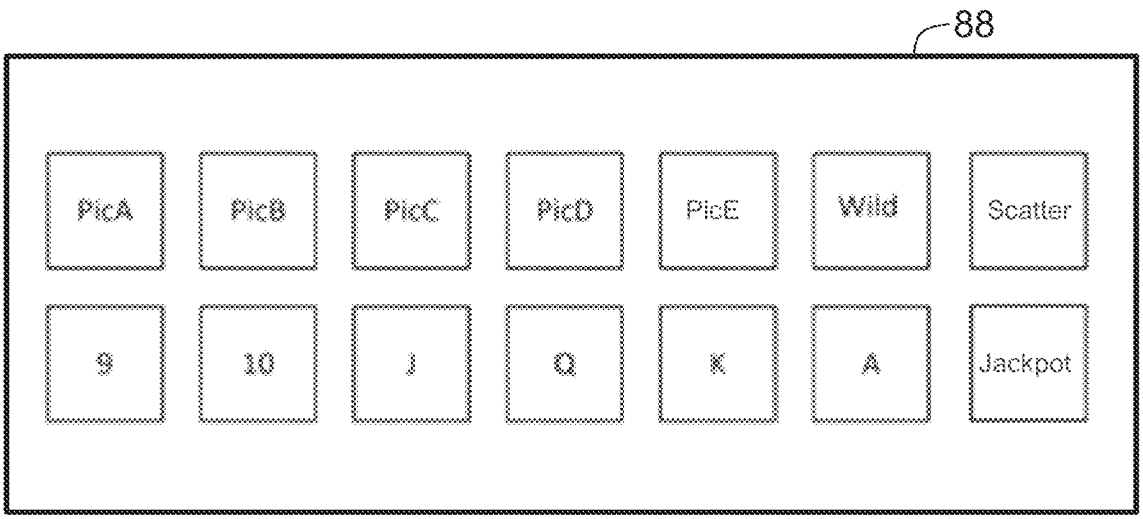
FIG. 5 is a figure showing the symbols displayed on the display area, according to an embodiment of the present invention.

Each virtual reel strip 72 to 80, in the examples of FIG. 4, may be configured by 35 symbols 84 in respective symbol positions 86, and those symbols 84 are aligned in an order defined by each reel. FIG. 5 is the details of symbols 84 of the figure shown in FIGS. 3 and 4. Each virtual reel strip 72 to 80 includes symbols selected from a symbol set 88 of varieties of symbols 84 shown in FIG. 5. This symbol set 88 includes card symbols ("9", "10", "J", "Q", "K", and "A") that imitate playing cards as regular symbols, and picture symbols ("PicA", "PicB", "PicC", "PicD", "PicE") that show a pattern. Further, this symbol set 88 includes a wild symbol ("Wild") that is substituted as another symbol when a win combination is determined. Each of these symbols have a different rank from each other regarding their value when winning, their rank gradually raises in this order: "9", "10", "J", "Q", "K", "A" "PicE", "PicD", "PicC", "PicB", "PicA". A combination of symbols that includes high-ranking symbols when winning, can obtain a larger winning payout compared to a combination of low-ranking symbols when winning.

As shown in FIG. 5 in the illustrated embodiment, the symbol set 88 may further include a Scatter symbol and at least one Jackpot symbol. As discussed above, in one embodiment the game feature may include at least one feature award and a Jackpot feature award. In one embodiment, the at least one feature award is a set award, e.g., a predetermined number of credits, and the Jackpot feature award is a progressive jackpot funded from a Jackpot feature award pool. In embodiment, the game feature may include an award of a number of free spins or games. The award of the free spins may be triggered by the appearance of a predetermined number of Scatter symbols in an outcome of the primary game.

The game feature may include a plurality of feature awards, each having an associated predetermined award, e.g., a predetermined number of credits. For example, the game feature may include MINI, MAJOR and MAXI feature awards; each having an associated predetermined award. The game feature may include a single progressive Jackpot feature award.

The set of symbols 88 may include a respective symbol for each feature award and a symbol for the Jackpot feature award. Alternatively, the set of symbols 88 may include a respective symbol for each feature award. For each instance of the primary game, each feature award symbol may be randomly upgraded to a Jackpot feature award symbol (see below). In a further embodiment, each virtual reel 72, 74, 75, 78, 80 may include one or more of varying symbol positions. Before each instance of the primary game, a random one of the feature award symbols may be selected for each varying symbol positions. In addition, each feature award symbol may be randomly upgraded to a progressive Jackpot symbol.

It should be noted that in one aspect of the present invention, one or more dynamic virtual reel strips may be utilized. Using virtual reel strips, the symbols and/or symbol positions and/or virtual reel strips and/or length or size and/or any aspect of a virtual reel strip may change from one spin or play to the next. For example, a dynamic reel strip includes a plurality of symbol positions with symbols from the symbol set 88 and one or more of varying symbol positions. The varying symbol positions may be in the form of one or more stacks, i.e., adjacent symbol positions. In one embodiment, the location and/or size of the stacks may change from one spin to the next, either randomly and/or in a predetermined pattern.

Alternatively, a virtual reel strip associated with a cell 70 (or column of cells 70) may be dynamically changed from one spin or play to another spin or play. This, may occur randomly, every spin or play and/or in a predetermined pattern.

It should be noted that in the illustrated embodiment, each column of the grid 68 has a corresponding reel strip. When the reel strip stops, a symbol from the respective reel strip appears in each one of the cells of the respective column of the grid 68. One or more of the reel strip 72 to 80 may be identical or all of the reel strip 72 to 80 may be different.

In an alternative embodiment, however, each cell 70 of the grid 68 has a respective independent reel that may spin independently of the other reels. Each cell 70 of the grid 68 may, thus, have an independent reel with a corresponding virtual reel strip 72 to 80. The virtual reel set 82 may include different number of virtual reel strips in such a case. For example, in an example in which a 3×5 grid is utilized, each cell 70 would have an associated virtual reel strip, so fifteen reel strips would be utilized. As above, one or more of the fifteen virtual reel strips may be identical or all reel strips may be different.

In the next several embodiments, the present invention will be described with respect to a 3×5 grid, however, it should be noted that the present invention is not limited to a grid with any specific size and/or shape.

In general, the control unit 22 starts a game and determines the stop position of each virtual reel strip 72 to 80 randomly. The virtual reel strips 72 to 80 that are displayed in the display unit 24 (for example, the lower display 16) are moved from a current position, and stopped based on a stop position to express an outcome of the game. Due to this, in the display or grid 68, the symbols included on the virtual reel strips 72 to 80 are continuously moved (scrolled or spun) in a vertical direction of the display area 64, and one symbol of one cell 70 is aligned in an order of the symbol based on the symbol arrangement is stopped so that it is displayed.

The control unit 22 changes and stops the plurality of symbols displayed on the display unit 24 according to the operation of the player received by the operation unit 32, and a payout may be paid according to the stopped symbols inside the display area 64.

In the display area 64, a pay line is set that is used when winning is determined. The pay line is set to be extended over the column on the right end from the cells of the column of the left end, and is a line that combines the plurality of cells 70 determining a win. The number of effective lines within the set pay line may be selected by the operation of a group of line designation buttons included in the group of setting buttons 34 of the operation unit 32 for the player. The control unit 22, in regards to the result of a game that is a combination of symbols, determines a win when a predetermined number of identical symbols is surpassed and aligned on a set pay line, and pays a payout to the player according to the type and number of symbols. On the gaming machine 10 of the present embodiment, a predetermined number of pay lines (LINE 1-40) of cells with three rows and five columns in the display area 64 is set (see FIG. 6). The system for determining a win may determine a win when a predetermined number of identical symbols from cells of the column on the left end are aligned on a set pay line, may determine a win when a predetermined number of identical symbols from cells of the column on the right end are aligned on a set pay line, and may determine a win when a predetermined number of identical symbols are aligned on a continuous column on a predetermined pay line. In addition, more than a predetermined number of the "Trigger" form a win combination or trigger condition regardless of the pay line.

Figure 6:
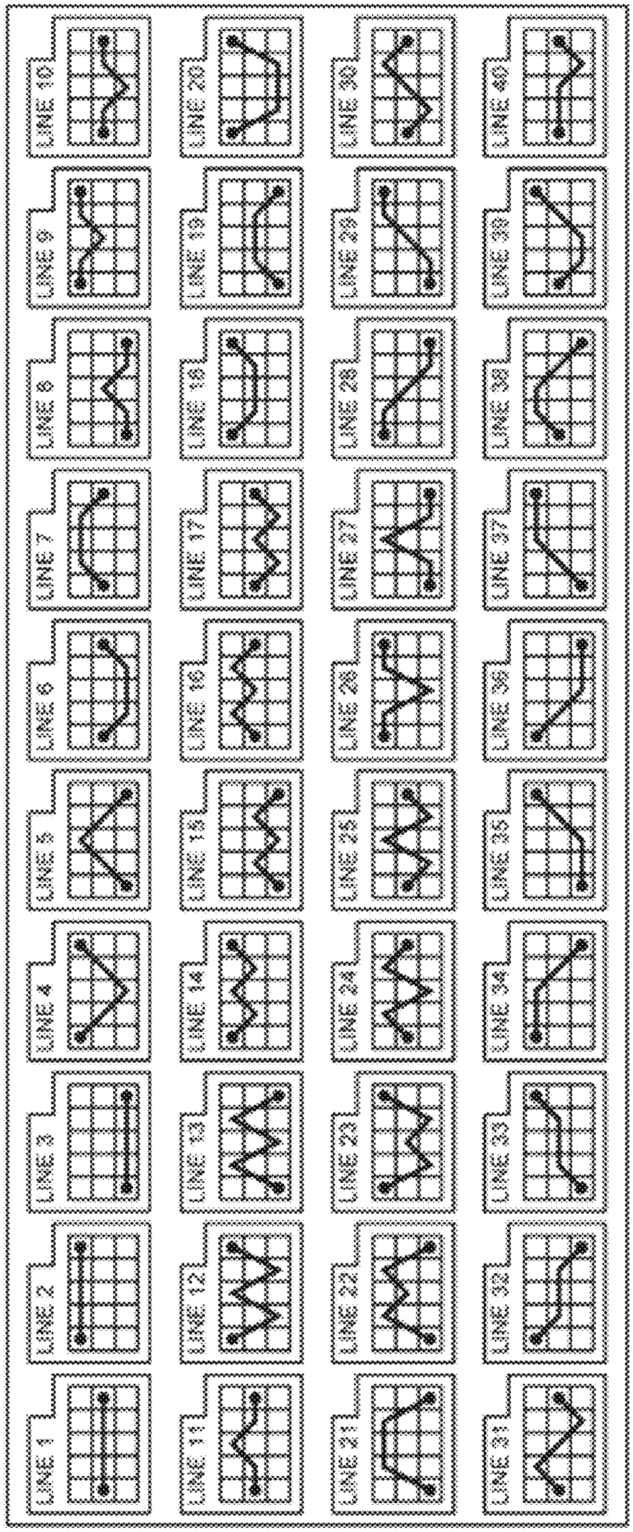
FIG. 6 is a figure showing one example of a pay line set on the determination area in FIG. 5.
Figure 7:
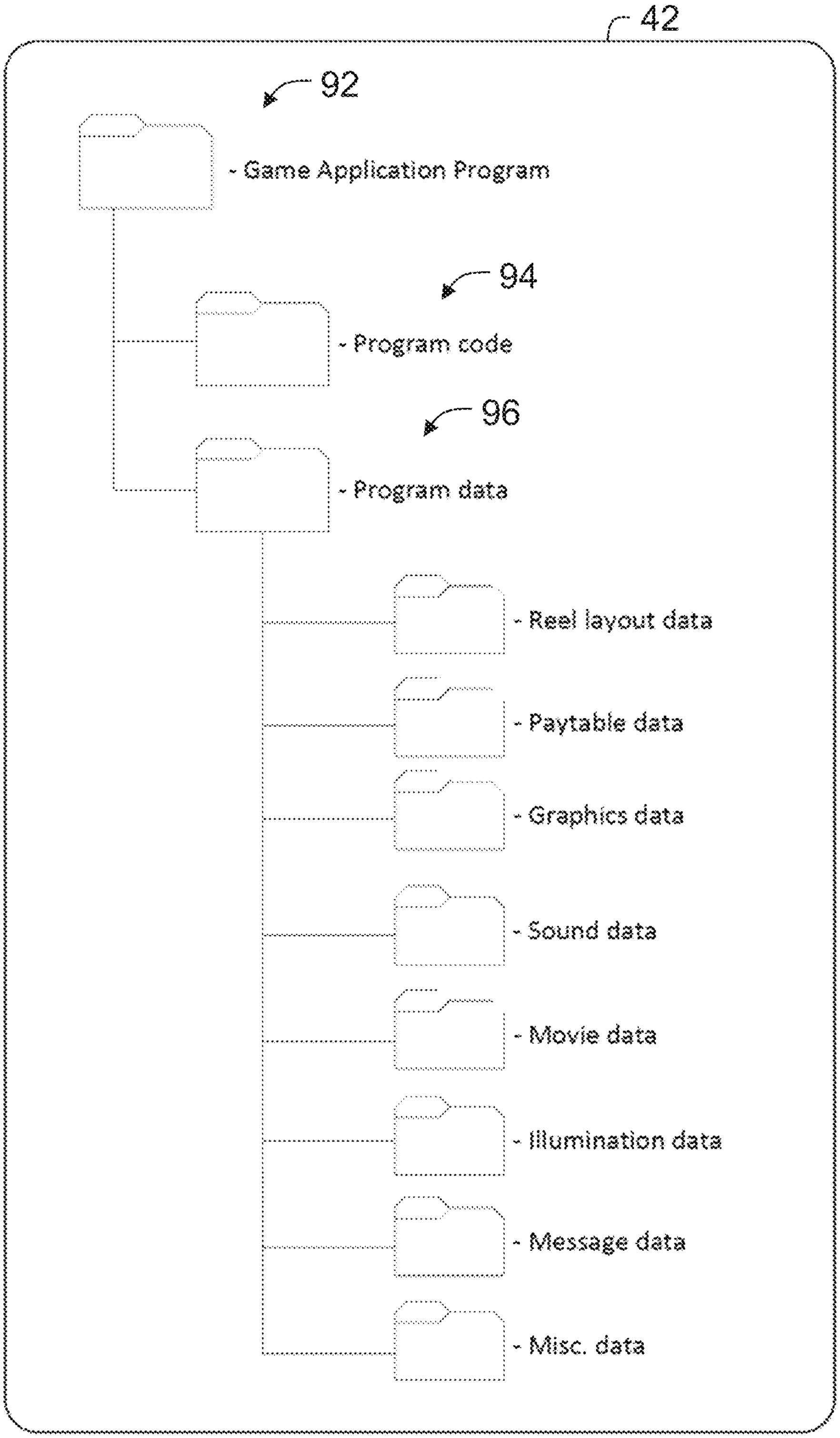
FIGS. 7-10 are block diagrams of a game control unit that may be used with to perform the function of executing a game on the gaming machine shown in FIG. 1A-2.
Figure 8:
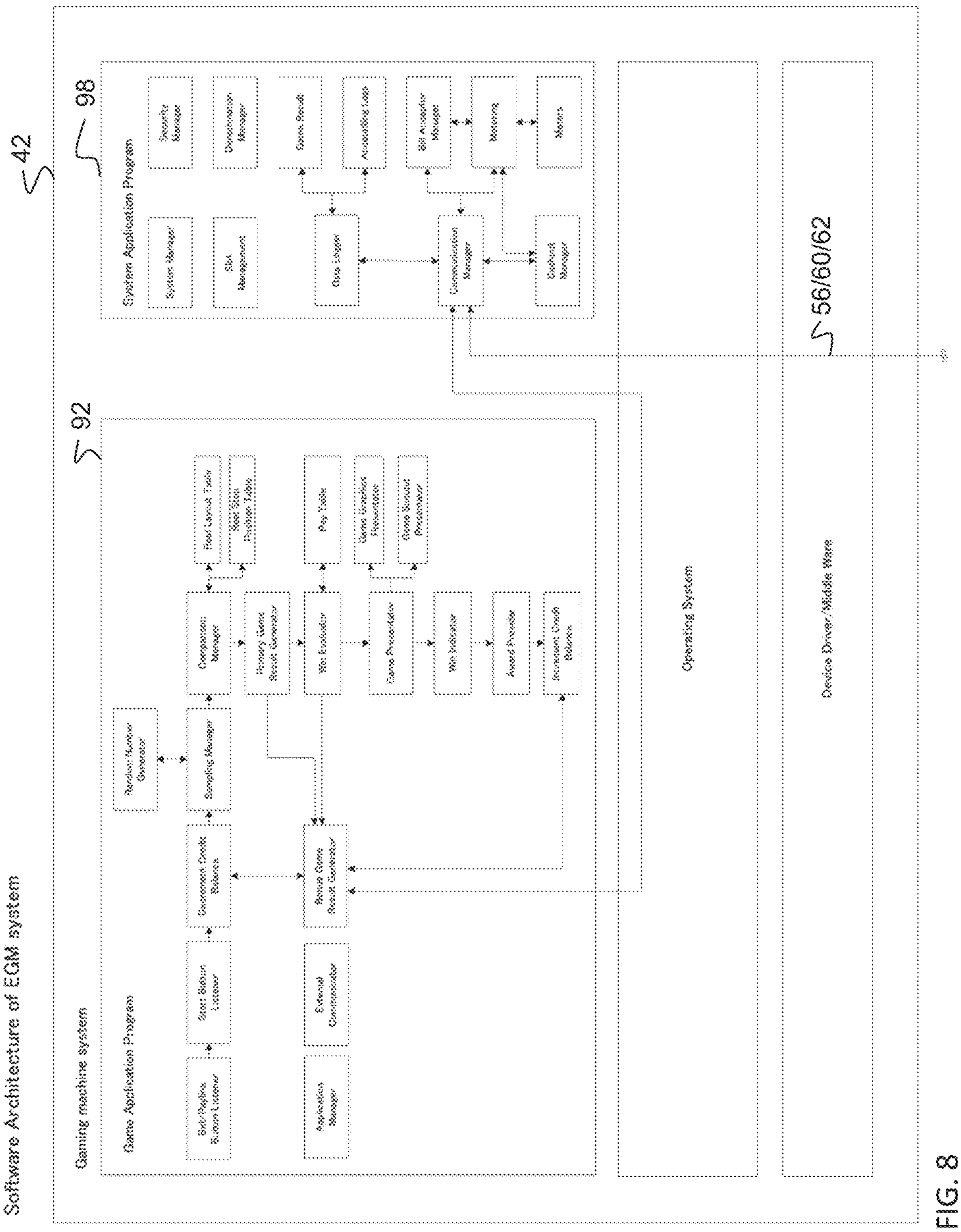
Figure 9:
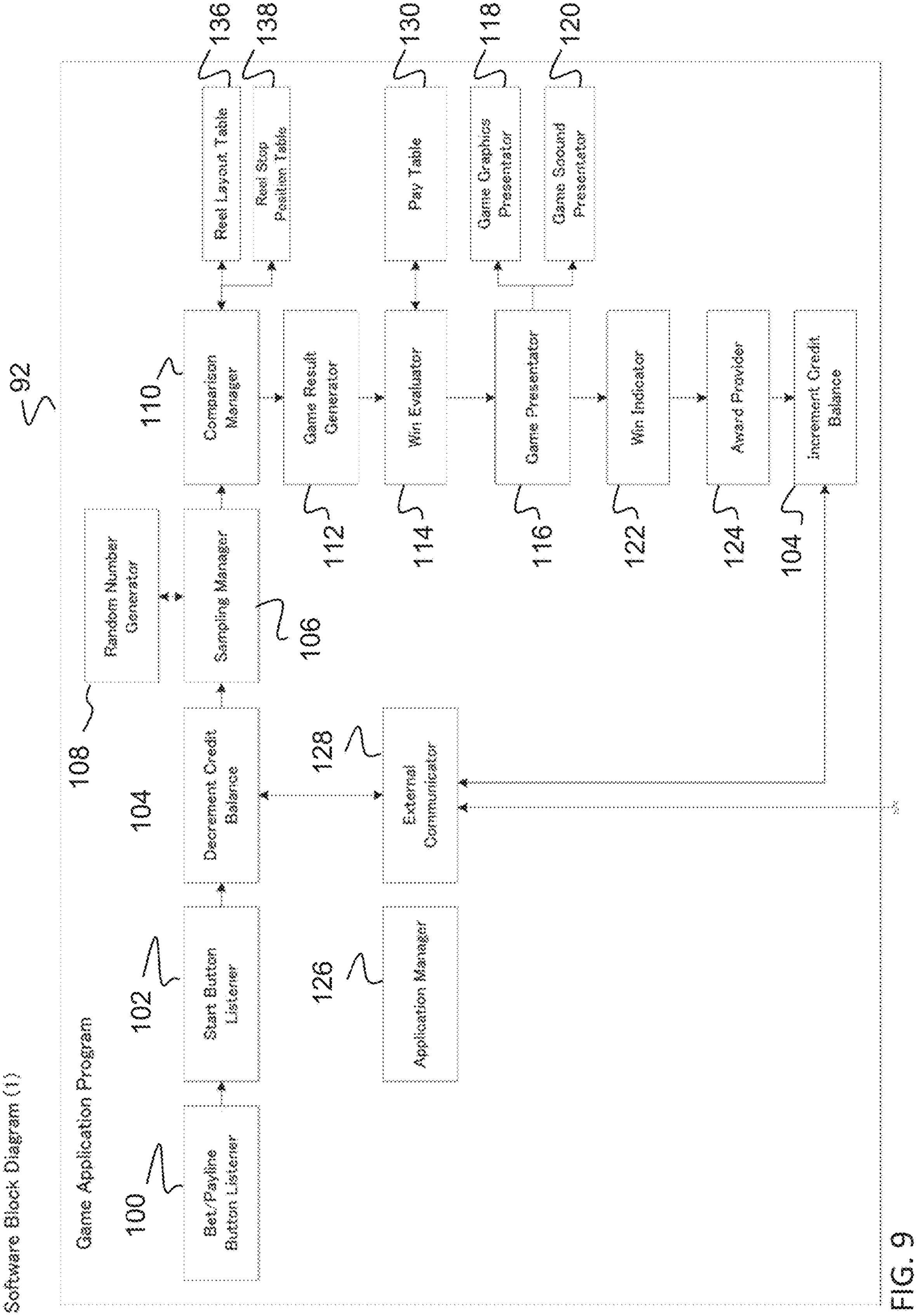
Figure 10:
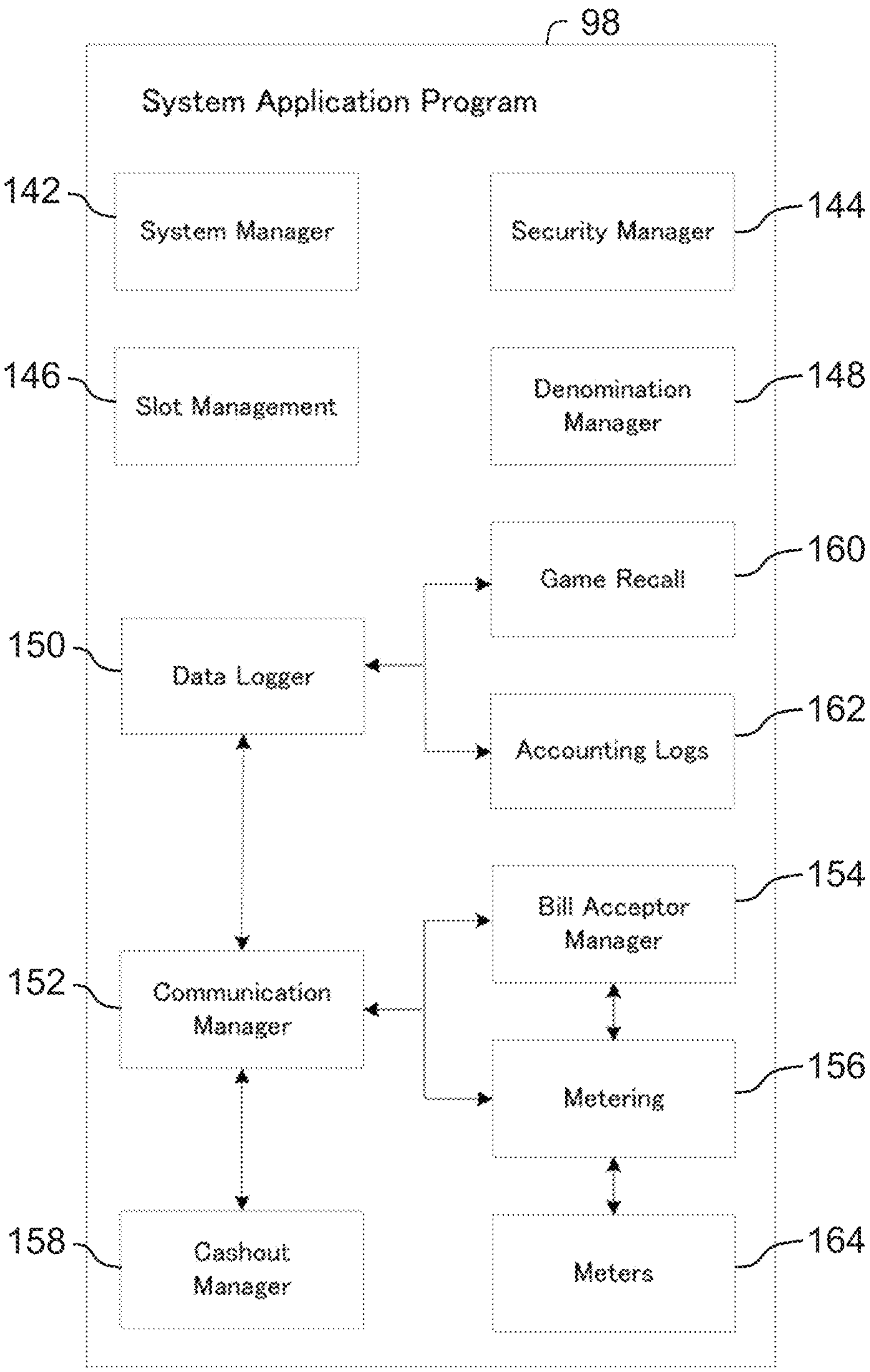

It should be noted that pay lines shown other than (or in addition to) the pay lines shown in FIG. 6 may be used. In general, the pay lines shown in FIG. 6 start in the first column and end in the last column, and include one cell per column. However, one or more pay lines could include one or more cells in the same column and may include a vertical pay line.

Referring to FIGS. 7-10, in the illustrated embodiment, the memory 42 stores a game application program 92 that includes computer executable instructions that, when executed by the processor 38, cause the processor 38 to generate and display the game on the display unit 24 of the gaming machine 10. In one embodiment, the game application program 92 includes program code 94 and program object data 96 that includes computer executable instructions for implementing a game using the algorithms shown in FIGS. 13-18.

In the illustrated embodiment, the memory 42 stores the game application program 92 and a system application program 98 that includes computer executable instructions that, when executed by the processor 38, cause the processor 38 to generate and display the game on the display unit 24 of the gaming machine 10. The application program 92 provides game specific/front-end functions and the system application program 98 provides generic/back-end functions, when executed by the processor 38. In the illustrated embodiment, the game application program 92 and the system application program 98 are implemented on the same operating system. However, it should be noted that these programs may be implemented on different operating system and/or by different processors. In one embodiment, the game application program 92 includes a plurality of software modules including a bet/payline button listener module 100, a start button listener module 102, a credit balance manager module 104 (including a decrement credit balance module and an increment balance module), a sampling manager 106, a random number generator 108, a comparison manager 110, a game result generator 112, a win evaluator 114, a game presentator 116, a game graphics presentator 118, a game sound presentator 120, a win indicator 122, an award provider 124, an application manager 126 and an external communicator 128. The game application program 92 may also include a pay table 130, a reel layout table 136 and a reel stop position table 138.

The bet/payline button listener module 100 is a software module for receiving a signal from the bet button or the payline button which is generated by the button when a player operates the button to select number of bet or number of paylines. In response to receiving the signal, the bet/payline button listener module 100 communicates the occurrence of the signal to application manager 126 for changing bet or payline configuration of the game. It some embodiments, the player may select the paylines to be played. The number of paylines selected will establish or affect the player's wager. In other embodiments, the paylines are fixed and the player may choose a bet level and/or a denomination which will establish the value of the player's wager (see below).

The start button listener module 102 is a software module for receiving a signal from the start button which is generated by the button when a player operates the button to start a game. In response to receiving the signal, the start button listener module 102 communicates the occurrence of the signal to application manager 126 for starting the game.

In response to receiving the signal from start button listener module 102, the application manager 126 requests the sampling manager 106 to obtain necessary number of random numbers from the random number generator 108.

The random number generator 108 generates random numbers based on predetermined algorithm of computational random generation method. The random number generator 108 may be a pseudorandom generator. In response to a request from sampling manager 106, the random number generator 108 returns random number. In some implementations, the random number generator 108 may be implemented in a central server. The random number generator 108 may be implemented as an integrated circuit or hard wired logic.

The reel stop position table 138 (also shown in FIG. 13) includes a random number range associated with each stop position of a virtual reel strip. The comparison manager 110 identifies a stop position of each reel based on corresponding random number and the stop position table 134. For example, the sampling manager 106 requests random numbers within predetermined range listed in the reel stop position table 136 to the random number generator 108, the random number generator 108 returns requested random numbers and the comparison manager 110 determines corresponding stop positions of the reels. It should be noted that the random number range associated with each stop position might be different and/or weighted.

The game result generator 112 generates game result based on selected reel layout, stop positions of each reel, stop position of inner symbol, and bonus features.

The win evaluator 114 evaluates the game result with reference to the pay table 130.

The game presentator 116 provides game presentation process with visual and sound so as to form the predetermined game result finally.

The game graphics presentator 118 provides visual game presentation process on the display so as to form the predetermined game result finally.

The game sound presentator 120 provides sound presentation process by using sound controller and speakers.

The win indicator 122 indicates win combinations and payment condition of prize symbol formed in the game result.

The award provider 124 provides award credit to win meter based on the win evaluation.

The application manager 126 administrates activity and status of each software module. In addition, the application manager 126 administrates configuration, progress and states of the game application program 92.

The external communicator 128 communicates instruction and data with the system application program 98.

The credit balance manager module 104 executes a process for decrementing credit balance and incrementing credit balance based on win amount displayed in win meter.

The pay table 130 includes a prize associated with each win combination.

The game feature manager 131 functions to execute the game feature (as a part of the primary game, a bonus game and/or a stand-alone game) by executing the respective algorithms (see below).

In the illustrated embodiment, the system application program 98 provides back ground processing and functions other than game specific functions. The system application program 98 includes a plurality of software modules including a system manager 142, a security manager 144, a slot management module 146, a denomination manager 148, a data logger 150, a communications manager 152, a bill acceptor manager 154, a metering module 156, and a cashout manager 158.

The system application program 98 may also include a game recall file 160, accounting logs 162, and meters 164.

The system manager 142 is a software module for administrating all of the back ground processing and functions other than game specific functions conducted by the system application program 98.

The security manager 144 is a software module for administrating game verification, door security and monitoring security sensors.

The slot management module 146 is a software module for administrating data accumulation and communicating with an external slot information system or slot account system 62.

The denomination manager 148 is a software module for establishing denomination setting of the gaming machine 10. The denomination setting may include 1 cent, 2 cent, 5 cent, 25 cent, 1 dollar, 5 dollar and the like.

The data logger 150 is a software module for logging result of each primary game and the game feature (or bonus game) to the game recall. In addition, the data logger 150 stores error events, bill log, cashout log, ticket log etc. to the accounting log.

The game recall file 160 is an accumulated data including results of each primary game and free game bonus. The game recall file 160 is stored in a non-volatile memory.

The accounting logs 162 is an accumulated data including error events, bill log, cashout log, ticket log etc. The accounting logs 162 are stored in a non-volatile memory.

The communications manager 152 is a software module for administrating communication between game application program 92 and system application program 98. The communications manager 152 also administrates network communication between system application program 98 and external network such as slot management system network, G2S network, gaming server for server based gaming network or VLT system network.

The bill acceptor manager 154 is a software module for administrating the bill acceptor and receives bill information inserted in the bill acceptor. In response to receiving the information from the bill acceptor, the bill acceptor manager 154 communicates with the metering for incrementing credit balance based on the inserted bill.

The metering module 156 is a software module for adjusting values of the meters 164 in response to communication with the game application program 92 via communications manager 152, the bill acceptor manager 154 or the cashout manager 158. The meters 164 includes a credit meter for indicating current credit balance on the gaming machine and an win meter for indicating win amount of current game session. The meters further include back ground meters such as coin-in, coin-out, total drop, attendant paid jackpots and/or bill-in. In addition, the meters might further include progressive jackpot value that is incremented by a percentage of each bet placed on the gaming machine. These meters might be implemented as data on the non-volatile memory or hardware meters.

The cashout manager 158 is a software module for administrating cashout procedure. In response to a player's operation on the cashout button, the cashout manager 158 is activated and the gaming machine pay total amount of the credit meter.

Figure 11:
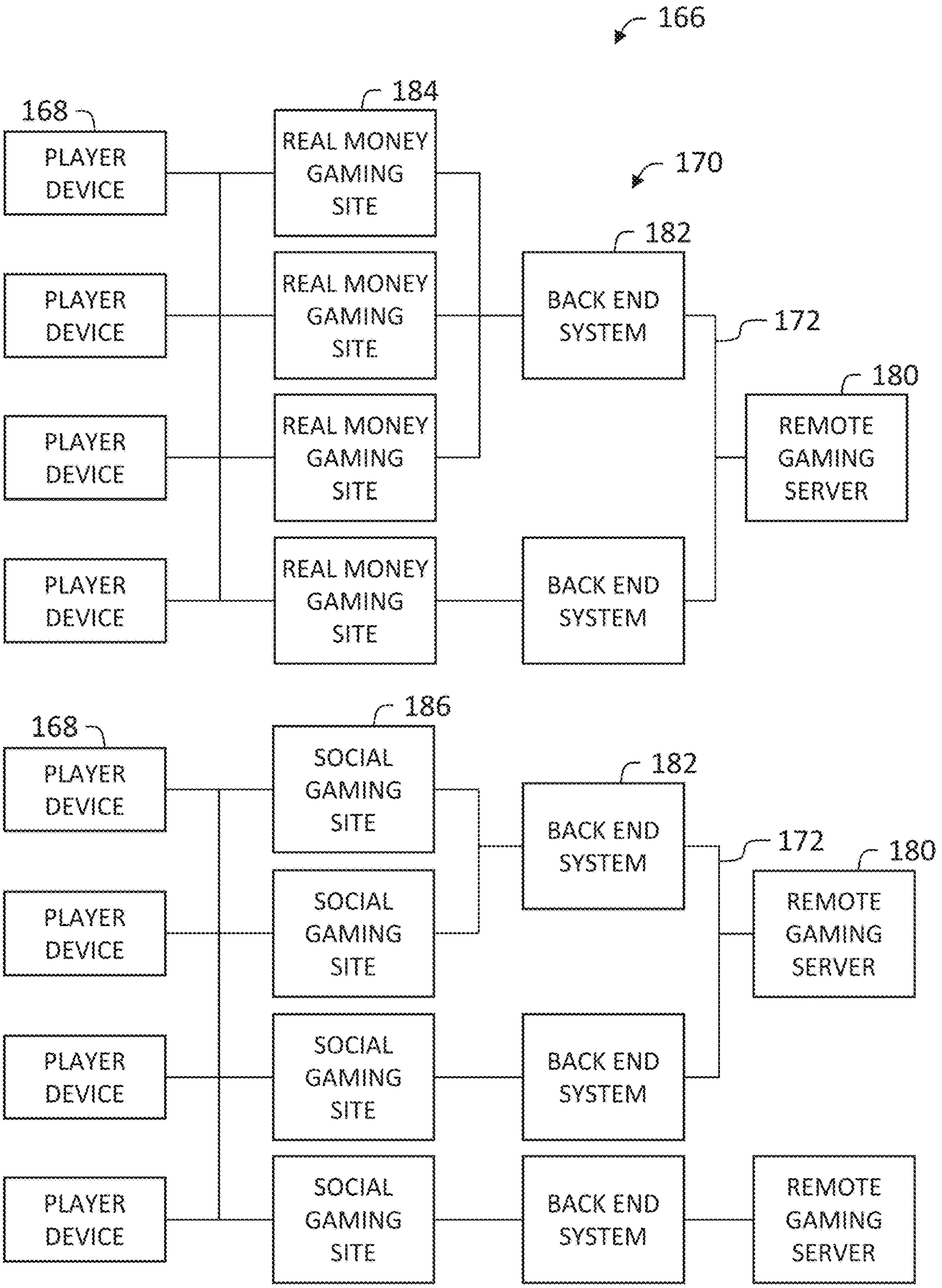
FIG. 11 is a functional block diagram of a server computer system, according to an embodiment of the present invention.
Figure 12:
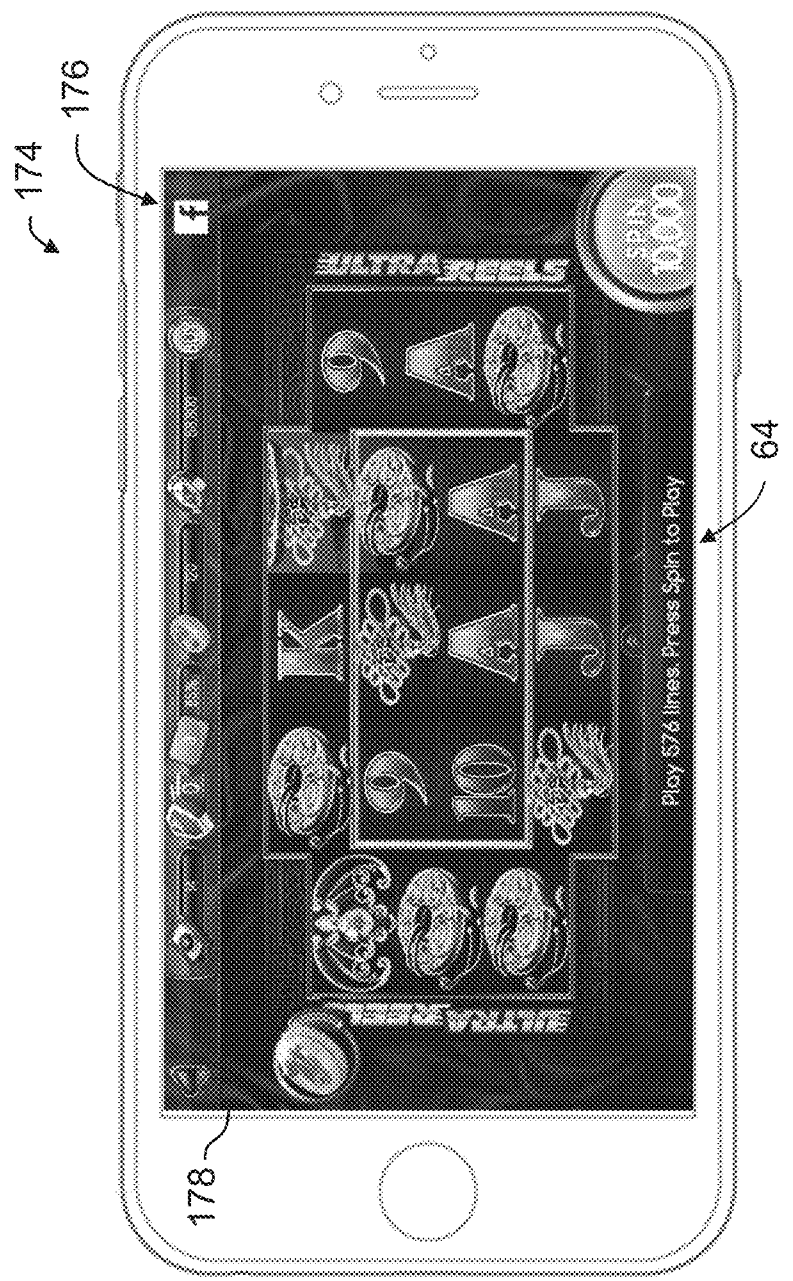
FIG. 12 is a front view of a mobile computing device that may be used with the server computer system of FIG. 11.

Referring to FIGS. 11 and 12, in one embodiment, the present inventions includes a networked server computer system 166 that is configured to deliver the game to one or more client computing devices 168 over the Internet. In the illustrated embodiment, the networked server computer system 166 includes an iGaming server system 170 that is coupled in communication with one or more client computing devices 168 via a communications network 172. The communications network 172 may be any suitable connection, including the Internet, an Intranet, LAN, a virtual private network (VPN), cellular networks, etc. . . . , and may utilize any suitable or combination of technologies including, but not limited to wired and wireless connections, always on connections, connections made periodically, and connections made as needed.

The client computing device 168 may include any suitable device that enables a user to access and communicate with the server system 170 including sending and/or receiving information to and from the server system 170 and displaying information received from the server system 170 to a user. In the illustrated embodiment, the client computing device 168 includes a processor coupled to a memory device. The memory device stores various programs and data that are executed by the processor for operating the client computing device 168. The client computing device 168 also includes an input device configured to receive operational inputs from the user, and a display device configured to display a graphical user interface. The input device and display device enable a user to interact with the server system 170 via the client computing device 168. For example, in one embodiment, the client computing device 168 may include, but is not limited to, a desktop computer, a laptop or notebook computer, a tablet computer, smartphone/tablet computer hybrid, a personal data assistant, a handheld mobile device including a cellular telephone, and the like. In one embodiment, the processor of the client computing device 168 may be programmed to function as the control unit 22 of the gaming machine 10.

In the illustrated embodiment, the client computing device may include a web browser program stored in the memory device. The processor executes the web browser program to display web pages on the display device that includes information received from the server system 170 to enable a user to interact with and operate the server system 170.

In one embodiment, the client computing device 168 includes a mobile computing device 174 (shown in FIG. 12) such as, for example, a tablet computer, a smartphone/tablet computer hybrid, a smartphone such as an iPhone™, and the like. The mobile computing device 174 includes a processor coupled to a memory device for storing various programs and data for use in operating the mobile computing device 174. The mobile computing device 174 may also include a touchscreen display unit 176, one or more video image cameras, one or more speakers, a microphone, at least one input button, and one or more sensors including, but not limited to, a touch ID fingerprint sensor coupled to an input button, a barometer, a three-axis gyro, an accelerometer, proximity sensor, and an ambient light sensor. In addition, the mobile computing device 174 may also include a Wi-Fi antenna, a cellular network antenna, a Bluetooth™ communications device, assisted GPS and GLONASS, a digital compass, and an iBeacon™ microlocation device.

The mobile computing device 174 may be programmed to store and execute mobile computer program applications that display graphical user interfaces 178 on the touchscreen display unit 176 including display area 64 that allows the user to access the server system 170 to retrieve and store information within the server system 170 as well as interact with and operate the server system 170. In addition, in one embodiment, the server system 170 may install one or more mobile computer application programs in the memory device of the mobile computing device 174. When initiated by the processor of the mobile computing device 174, the mobile computer application program causes the processor of the mobile computing device 174 to perform some or all of the functions of the gaming machine 10.

In the illustrated embodiment, the server system 170 includes one or more remote gaming servers 180, one or more back-end servers 182, one or more real money gaming web site hosting servers 184, and one or more social gaming website hosting servers 186. In the illustrated embodiment, the social gaming website hosting server 186 and the real money gaming website hosting server 184 are programmed to host a website that is accessible by a user via one or more client computing devices 168. The website hosting servers 184 and 186 execute a website application program that retrieves application code from the back-end server 182 and executes the application code to render one or more webpages on a display device of a client computing device 168 in response to requests received from the user via the client computing device 168 to allow users to interact with the website. The website hosting servers 184 and 186 are configured to generate and display webpages displaying a game. For example, the real money gaming website hosting server 184 is configured to host a real money wagering website that enables players to convert monetary funds to gaming credits that may be used to place wagers on the game. The social gaming website hosting server 186 is configure to host a social media and/or social gaming website that allows players to receive gaming credits for activities such as purchasing goods and/or services through an e-commerce website, and/or purchase gaming credits that may be used to play the game.

Each back-end server 182 is configured to perform operations to support the functions of the webpages and/or website being displayed by the website hosting servers 184 and 186. For example, in one embodiment, the back-end servers 182 may include a player account system server that is configured to generate player accounts that include data associated with a player including, but not limited to, player identification information, player financial account information, player gaming credit account information, and/or any suitable player information, that may be used to establish credit meters and allow players to place wagers on the game.

Each remote gaming server 180 includes one or more copies of the game application program 92 stored in a memory device of the remote gaming server 180. A processor of the remote gaming server 180 is programmed to retrieve and transmit the game application program 92 to one or more back-end servers 182 for use in displaying the game to the user via a webpage being displayed by the web browser program.

In one embodiment, the game application program 92 may include instructions for rendering the game and executing the game on the client computing device 168. For example, the game application program 92 may include instructions for generating rendered code, such as, for example HTML code, that may be used by the web browser program of the client computing device 168 for displaying the game. For example, the game application program 92 may include program software code including, but not limited to, HTML, JavaScript, cascade style sheets (CSS), and any suitable programming code that may be used for rendering and operating the game via a website and/or mobile computer application.

In one embodiment, upon receiving a request from the website hosting servers 184, 186 via the back-end server 182, the remote gaming server 180 may execute the game application program 92 to operate the game, and execute a render-to-string operation to generate rendered code indicative of the primary game and/or game feature and/or bonus game, such as, for example HTML code, and transmit the rendered code to the back-end server 182. The back-end server 182 may then transmit the rendered code to the corresponding web site hosting servers 184, 186 for use in displaying the game on the website. As the player plays the game, the remote gaming server 180 may execute the game application program 92 for each instance of the game, and transit rendered code to the back-end servers 182.

In another embodiment, the remote gaming server 180 may transmit the game application program 92 to the back-end server 182 and/or the website hosting servers 184, 186. The back-end server 182 and/or the website hosting servers 184, 186 may then execute the game application program 92 to initiate the instances of the game and execute render-to-string operations to generate rendered code indicative of the game.

In yet another embodiment, the back-end server 182 may receive a request to initiate the game from a mobile computing device 174 executing the mobile computer application program. Upon receiving the request, the back-end server 182 may access the game application program 92 and execute a render-to-string operation to generate rendered code indicative of the game and transmit the rendered code to the mobile computing device 174. In one embodiment, the back-end server 182 may continuously execute the game application program 92 to generated each instance of the game using a random number generator of the back-end server 182 based on input received from the mobile computing device 174 and generate and transmit rendered code for each instance of the game to the mobile computing device 174. In another embodiment, the back-end server 182 may execute a partial-render operation and generate partially-rendered code of the game using the game application program 92, and transmit the partially rendered code of the game and object data of game assets to the mobile computing device 174. The partially rendered code includes instructions for generating rendered code using the game assets and a random number generator of the mobile computing device for generating and displaying the game on the mobile computing device 174 using the mobile computer application program.

In one embodiment, the game application program 92 may be stored on several different servers. The game code on these servers is used to distribute game content to social or real money gaming websites and mobile applications. The distribution method is very flexible. For example, the game code and/or game application program 92 including game code and game object assets may be stored on a remote gaming server 180. One remote gaming server 180 may be connected to one or more back-end server 182.

Each back-end server 182 is configured to distribute the games to one or more websites or mobile applications.

Players connect to these websites/mobile applications with the client devices or mobile devices and have access to the game content. A copy of game application program 92 including game code and game object assets is stored on the remote gaming server 180 for each back-end server 182 that is connected to the remote gaming server 180 and that distributes the game. For example, if one remote gaming server 180 is connected to two back-end servers 182, which is connected to three website hosting servers 184, 186 that distribute the game, the remote gaming server 180 would store two copies of the game application program 92 including game code and game object assets for the game (e.g. one copy for each back-end server 182).

For example, the server system 170 may be configured to implement the game on a mobile application such as, for example, "my KONAMI Slots™" mobile application available in Apple iOS™, Google Android™, and Amazon Kindle™ operating platforms, or on social-media websites such as the "my KONAMI Slots™" available on Facebook™. In one embodiment, the mobile application may download the game code from remote gaming server 180 via the real money gaming site 184 or the social gaming site 186 and execute the game code on the client computing device 168. In this embodiment, the game code may provide game specific/front-end function when executed by the processor of the client computing device, and the back-end server 182 may provide generic/back-end function.

Figure 14:
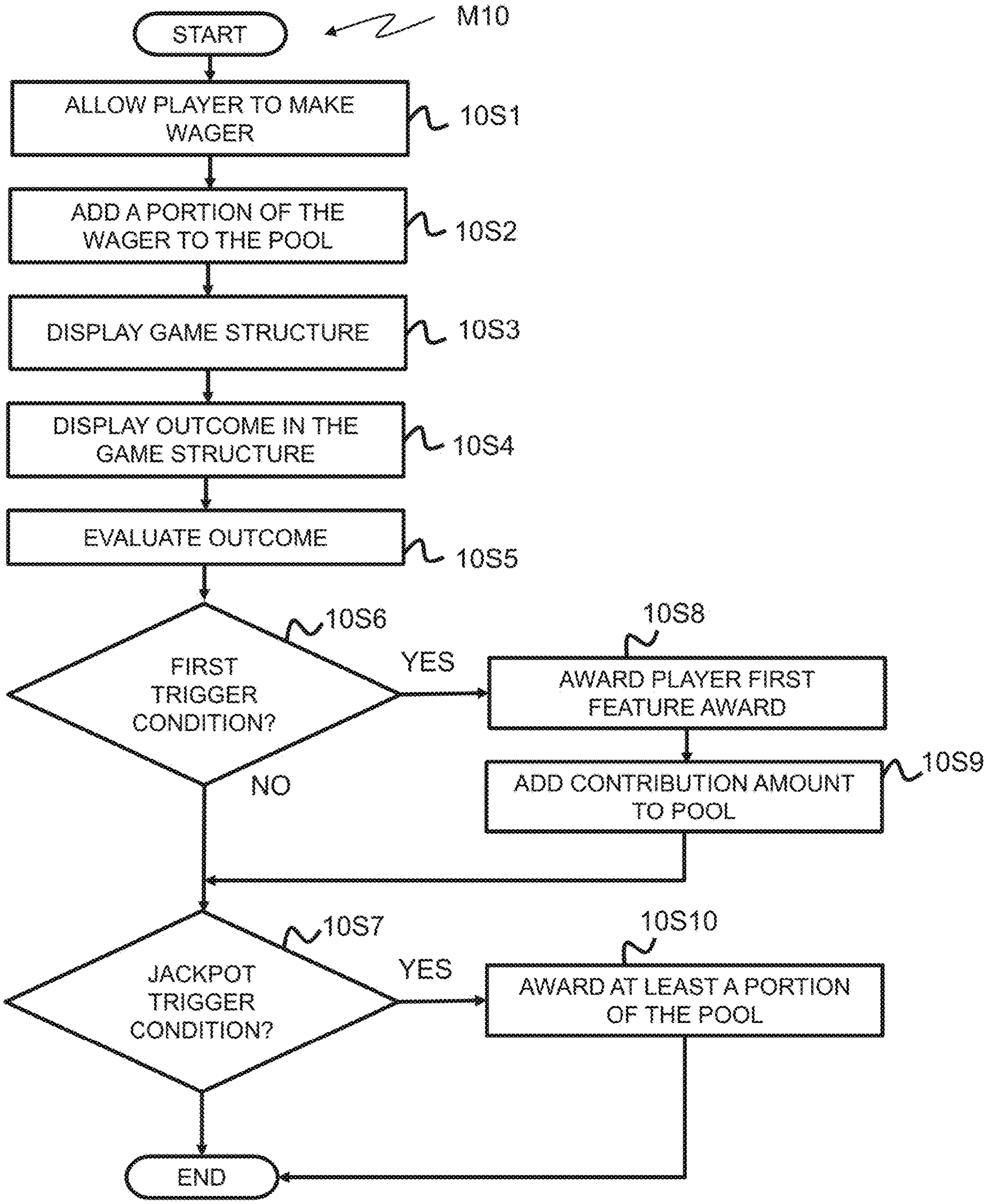
FIG. 14 is a flow chart illustrating an algorithm used during operation of the gaming machine during a game, according to one embodiment of the present invention.

FIG. 14 is a flowchart of a method M10 illustrating the algorithms included in the game application program 92 and performed by the processor 38 when executing the game application program 92 for operating the gaming machine 10 and/or iGaming server system 170 to implement the primary game, game feature and/or bonus game. The methods include a plurality of steps. Each method step may be performed independently of, or in combination with, other method steps. Portions of the methods may be performed by any one of, or any combination of, the components of the gaming machine 10 and/or iGaming server system 170.

In the illustrated embodiment, the game application program 92 includes computer instructions for generating a primary game and/or a game feature and/or a bonus game that includes displays a game structure on a display unit and a number of pointers for use in the game feature. In general, the game feature provides a number of pointers for use in the game feature. In addition, the game feature provides an option to the player to select the number of pointers to be used in the game feature. In a specific embodiment, the number of pointers used in the game feature is dependent upon a wager amount made by the player.

The game feature may be provided during, or as bonus game to, a primary game. The primary game may include a reel-type game that includes a plurality of virtual reels that spin and stop to display the outcomes of the primary game. In other embodiments, the primary game may include a playing card game, a bingo game, a Keno game, and/or any suitable casino type wagering game. In alternative embodiments, the game feature is provided as stand-alone game.

In one aspect of the present inventionent invention, the gaming machine 10 includes an operation unit 32, a display unit 24, a memory device 42, 44 and a game control unit 22. The operation unit 32 is configured to receive an operation input of a player. The display unit 24 is configured to display a game screen including computer generated graphics (see above). The memory device 42, 44 stores a game execution program and a data configuration structure. The game execution program includes computer instructions for generating a game. The data configuration structure represents a jackpot feature award pool. The game control unit 22 executes the game execution program to provide the game to the player. The game control unit 22 is coupled to the operation unit 32, the display unit 24 and the memory device 42, 44 and includes a processor 38. The processor 38 is programmed to allow the player to establish a wager on the game, add a portion of the wager to the jackpot feature award pool, randomly establish an outcome of an instance of the game and display a game structure on the game screen on the display unit 24. The game structure displays the randomly determined outcome of the instance of the game. The processor 38 is further programmed to award the player a game award as a function of the outcome of the instance of the game, detect a first trigger condition associated with the instance of the game, and in response to detecting the first trigger award: (1) award the player a first feature award and (2) add a first feature contribution amount to the jackpot feature award pool. The processor is further programmed to detect a jackpot feature trigger condition associated with the instance of the game, and in response to detecting the jackpot feature trigger condition, award the player at least a portion of the jackpot feature award pool.

In one embodiment, the first feature award is a predetermined amount, e.g., a predetermined number of credits.

In one embodiment, the game feature may award three feature awards. Each feature award may be a predetermined amount, e.g., a predetermined number of credits and is triggered by respective triggering condition. When one of the feature awards is awarded to the player, a respective contribution amount is added to the jackpot feature award pool. For instance, in one embodiment the processor is further programmed to detect a second trigger condition associated with the instance of the game. In response to detecting the second trigger condition, the processor is programmed to award the player the second feature award and add a second feature contribution amount to the jackpot feature award pool.

In one aspect of the present invention, when the jackpot trigger condition is detected, all or a portion of the jackpot pool is awarded. In one embodiment, the amount of the jackpot award pool awarded as the jackpot feature award may be randomly determined.

As discussed above, the game structure may include a grid 68 having a plurality cells 70 arranged in a plurality of rows and columns. The outcome of an instance of the game includes a symbol randomly determined and displayed in each one of the plurality of cells. The displayed symbols are selected from a set of game symbols 88. In one embodiment, the set of symbols 88 may include a respective symbol for each feature award and a symbol for the Jackpot feature award. Alternatively, the set of symbols 88 may include a respective symbol for each feature award. For each instance of the primary game, each feature award symbol may be randomly upgraded to a Jackpot feature award symbol (see below). In a further embodiment, each virtual reel 72, 74, 75, 78, 80 may include one or more of varying symbol positions. Before each instance of the primary game, a random one of the feature award symbols may be selected for each varying symbol positions. In addition, each feature award symbol may be randomly upgraded to a progressive Jackpot symbol.

In one embodiment, the set of game symbols includes a first trigger symbol. The first trigger condition is the appearance of at least one first trigger symbol or a predetermined number of first trigger symbols in the outcome of the instance of the game. In one embodiment, before each instance of the game, a jackpot sub-symbol may be randomly added to the at least one first trigger symbol. The jackpot feature trigger condition is the appearance of at least one first trigger symbol with the sub-symbol, i.e., an upgraded trigger symbols, or predetermined number of upgraded trigger symbols in the outcome of the instance of the game.

The primary game may be a video slot game. In such embodiments, the data configuration structure may represents a plurality of virtual reels. Each virtual reel has a plurality of symbol positions populated by a game symbol. The processor 38 randomly determines an outcome of the instance of the game by establishing a stop position for each virtual reel. In one embodiment, each column in the grid may have an associated virtual reel. In an alternative embodiment, each cell 70 in the grid has an associated virtual reel.

Referring to FIG. 14, in the illustrated embodiment, in a first method M10, a primary game in the form of a virtual slot game is provided. In a first method step 10S1, the processor 38 is programmed to allow the player to establish a wager on the game. A portion of the wager is added to a jackpot feature award pool in a second step 10S2. An outcome of the instance of the game is randomly established in a third step 10S3. A game structure for displaying the randomly determined outcome of the instance of the game is displayed on a game screen on a display unit 24 in a fourth step 10S4. In a fifth step 10S5, the outcome of the instance of the game is evaluated. The player may be awarded a game award as a function of the outcome of the instance of the game.

In a sixth step 10S6, if a first trigger condition is not detected by the processor 38, then the method M10 proceeds to a seventh step 10S7. If, however, the processor 38 detects the first trigger condition, then the method M10 proceeds to an eighth step 10S8. In the eighth step 10S8, the player is awarded a feature award. In a ninth step 10S9, a first feature contribution amount is added to the jackpot feature award pool.

In the seventh step 10S7, if a jackpot trigger condition is not detected, then the method M20 ends. If the jackpot trigger condition is detected, then the method M10 proceeds to a tenth step 10S10. In the tenth step 10S10, a jackpot feature award, e.g., at least a portion of the Jackpot feature pool is awarded to the player.

As discussed above, in general, the game feature includes a game structure (see below) displayed on the display unit.

In one embodiment the game feature is provided in conjunction with a primary game. In one embodiment, during the primary game, the processor 38 randomly determines an outcome of an instance of the primary game and spins the virtual reel strips 72 to 80 and sequentially stops the virtual reel strips 72 to 80 to display the randomly generated outcome including a game symbol being displayed in each cell 70 of the grid 68. For example, in one embodiment, the processor 38 may execute one or more of the algorithms including receiving a signal indicating the player depressing the spin button and start spinning each virtual reel strip 72 to 80, obtain random numbers from the random number generator 108, and determine a stop position of each virtual reel strip 72 to 80 based on the random numbers and the stop position data file. In one embodiment, the processor may obtain a random number for each simulate virtual reel strip 72 to 80, i.e. five random numbers. The processor 38 then established a reel stop counter, "i", and sets the reel stop counter, i, equal to x. The processor 38 then identifies the $i^{th}$ virtual reel strip associated with the stop counter, i, and stops the identified virtual reel strip to display the corresponding symbols in the corresponding cells 70 associated with the identified virtual reel strip. The processor then increments the reel stop counter, i, by x, i.e. i=i+x, and repeats the process of identifying the virtual reel strip associated with the incremented reel stop counter and stopping the identified virtual reel strip. This process continues until each virtual reel strip has been stopped. In this embodiment, for example, the virtual reel strips are numbered 1-5. In one embodiment, during the reel spin, the player may initiate the stopping of the reels by depressing the spin button, which enables the player to accelerate game play.

In one embodiment, upon receiving a signal indicating the player depressing the spin button, the processor may generate each virtual reel strip 72 to 80 for use during the instance of the primary game. For example, in one embodiment, the processor 38 may execute the game application program 92 using the reel layout table 136 for use in generating each virtual reels 72 to 80. The processor 38 may access the reel layout table 136 and identify a reel designation and stop position associated with the virtual reel being generated, and access each sequential symbol position logic cell for generating and displaying the corresponding game symbols. The processor 38 then generates the corresponding virtual reel strip based on the instructions associated with each sequential symbol position logic cell, associated with the reel designation. In addition, the processor 38 accesses the inner symbol table to randomly select a symbol that is populated in symbol position designating a varying symbol ("inn"). Each "inn" logic cell is transformed into PicA, PicB, PicC, PicD, A, K, Q, J, 10 or 9 in each game, such that each "inn" logic cell is populated with the same symbol.

Upon stopping the virtual reel strips 72 to 80, the processor 38 determines if any winning combination of symbols is displayed in the outcome if the instance of the primary game, and determines an initial award associated with the winning outcome. In one embodiment, the processor 38 detects an appearance of a winning combination of game symbols in the outcome based on the paylines shown in FIG. 6, and provides an initial award based on the winning combination of symbols and a paytable.

In the illustrated embodiment, upon stopping the virtual reel strips 72 to 80 to display the outcome of the instance of the primary game, the processor 38 determines if a game feature or bonus triggering condition has occurred, and if so, the application manager 126 provides the game feature or the bonus.

In such an embodiment, a gaming machine 10 may provide a game in the form of a slot machine is described, but this is not limited thereto, and a game in the state of poker, a video card game called black jack, bingo, Keno, a wheel game and the like may be provided. Further, it is possible to apply the present invention to a pachinko machine or a pachinko slot machine.

In the embodiment, determining the stop position of each reel is described as consecutively acquiring a random number that is used respectively, but the acquisition procedure of the random number is not limited to this. For example, when the game starts, the control unit 22 acquires these random numbers in a batch, and each random number may be stored in the storage area of the non-erasing memory 42 or the storage 44 when power failure occurs. In this type of situation, even when a power failure and the like occurs during a game, because the control unit 22 acquired the random number from the memory 42 or the storage 44 when the game started before the power failure occurred, when resuming the game after recovering from a power failure, the progress of the game can be reproduced. For example, when a game result obtaining a high payout is formed right before a power failure occurs, the player will be greatly dissatisfied if the progress of the game is not similar after recovering from a power failure. However, as mentioned above when the game starts all of the random numbers are acquired in a batch, and by saving these random numbers in the memory 42 or the storage 44, such great dissatisfaction can be avoided for the player because the progress of a game similar to before a power failure occurred can be reproduced after recovering from a power failure.

In another embodiment, the player may initiate a game through actuation of a spin button (or other button). After initiation of the game, the control unit 22 randomly determines the step position of all reels. The control unit 22 may perform the check for the trigger condition before the reels stop spinning, and thus has already determined the outcome of the game. However, the control unit 22 displays the outcome of the game in a step by step process as discussed above.

Further, in the embodiment, a bill/ticket is displayed as game value, and received by these bill/ticket identification devices, and a form where a ticket is output by a printer device 30 is described, but the present invention is not limited to this. The game value is a concept including tangible objects such as a coin, bill, medal, ticket, and the like, or electronic data that has a value equivalent to these. For example, a coin is received by the coin acceptor, and there may be a form where a coin is paid by a coin hopper. A player is identified and credit that is accumulated in an account on a server is used, there may be a form where credit is paid to an account, information of credit stored in a storage medium of a magnetic card, IC card and the like is read and used, and there may be a form where credit is paid by writing to the storage medium.

Further, in the embodiment when showing a free game provided as a bonus game, a bonus game that uses a different virtual reel strips from a regular game may be provided. Further, there could be a provided a feature game according to a value of the random number acquired during a regular game.

Further, set conditions providing a bonus or feature game are not limited to trigger determination or line determination, for example there may be a configuration providing a bonus game when the bet number surpasses a predetermined value. There could be a configuration providing a bonus game according to a value of the random number acquired during a regular game.

Exemplary embodiments of a gaming device, a gaming system, and a method of providing an award to a player are described above in detail. The gaming device, system, and method are not limited to the specific embodiments described herein, but rather, components of the gaming device and/or system and/or steps of the method may be utilized independently and separately from other components and/or steps described herein. For example, the gaming device may also be used in combination with other gaming systems and methods, and is not limited to practice with only the gaming device as described herein. Rather, an exemplary embodiment can be implemented and utilized in connection with many other gaming system applications.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

INDUSTRIAL APPLICABILITY

In operation, one or more detailed embodiments or variations of the present invention are described below. Other features and advantages of the present invention may be identified or described with reference to the embodiment described below.

In a first embodiment, the present invention provides a primary game. The primary game is a video slot game with nine paylines. The primary game includes a game feature that includes 4 feature awards: a "GOLDPOT" progressive jackpot award, a "MAXI" jackpot or feature award, a "MAJOR" jackpot or feature award and a "MINI" jackpot or feature award. The GOLDPOT progressive jackpot award is a progressive awards and as funded from a pool that increments as a function of wagers made by the player on the primary game and when the MAXI, MAJOR and MINI jackpot or feature awards are paid (see below). In the present embodiment, the player may choose a denomination, e.g., 1 cent, 2 cents and 5 cents denominations, as well as a bet level, e.g., 50, 75, 100, 150 and 200 credits. The value of a player's wager is based on the chosen denomination and bet level. For instance, if the player has chosen a denomination of 1 cent and a bet level of 50 credits, then the value of the player's wager is 50 cents. Likewise, if the player has chosen a denomination of 5 cents and a bet level of 200 credits, then the value of the player's wager is $10.00.

The MAXI, MAJOR and MINI feature awards are non-incrementally fixed value awards. However, the MAXI, MAJOR and MINI feature awards may be scaled as a function of bet level and/or denomination.

The primary game is a video slot game that utilizes a 3×5 grid 68. The grid 68 includes a plurality of cells 70 arranged in 3 rows and 5 columns. Each column has an associated virtual reel or reel strip. Each reel strip has a number of symbol positions. Each symbol position is populated with a symbol from a set of symbols. In this embodiment, the set of symbol positions includes the following symbols: Scatter, Jackpot, PicA, PicB, PicC, PicD, PicE, A, K, Q, J, 10 and 9. For every spin, the Jackpot symbol is replaced with one of a MAXI, MAJOR and MINI jackpot symbols. Each one of the jackpot symbols may be randomly upgraded to an upgraded jackpot symbol.

In addition to the MAXI, MAJOR and MINI feature awards and the GOLDPOT progressive jackpot award, the game feature includes a free game feature. The free game feature is triggered when a predetermined number of the Scatter symbol appear in the outcome of an instance of the primary game (or a free game). In the described embodiment, the number of free games awarded is a function of the number of Scatter symbols appearing in the outcome. For example, if three, four or five Scatter symbols appear in the outcome, eight, twelve and twenty free games may be awarded. In alternative embodiments, a fixed number of free games or a random number of free games may be awarded. The free games or spin may utilize different, i.e., alternative, virtual reel strips. In general, the alternative virtual reel strips used in the free games with include more jackpot symbols.

Figure 17:
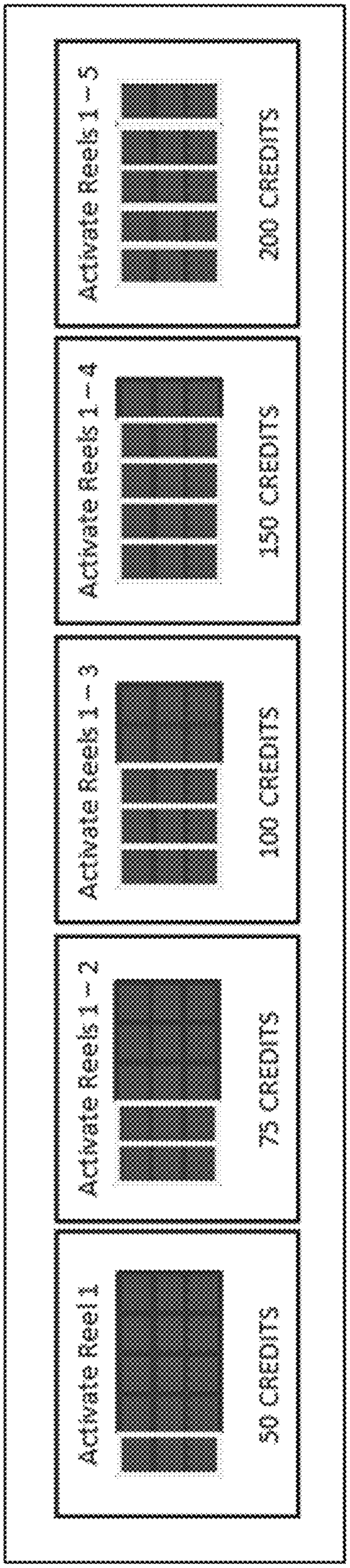
FIG. 17 is a graphical representation illustrating active reels based on selected bet levels, according to an embodiment of the present invention.

Upon triggering the free game feature, the Scatter symbols must appear in an activated reel or column of the grid 64 for free games to be awarded. The base bet determines which reels are activated. This may be represented graphically on the game screen, as shown in FIG. 17. The base bet level determines Further, the game feature may include an expanding Wild feature. In one aspect, one or more of the reels or columns of the grid 64 are "active" based on the bet level. As discussed above, in the described embodiment there are 5 bet levels: 50, 75, 100, 150 and 200. Based on the player's chosen bet levels, the following reels are "active":

50 credits: Reel 1,
75 credits: Reels 1-2,
100 credits: Reels 1-3,
150 credits: Reels 1-4, and
200 credits: Reels 1-5.

In a primary or free game, if a Wild symbol appears in a column of an active reel in an outcome of the primary or free game, the Wild symbol is expanded or copied into the other cells of the same column.

In either the primary game or a free game a virtual reel strip may be randomly replaced with an alternative reel strip with a different distribution of symbols.

It should be noted that the virtual reel strips include a plurality of cells populated with a jackpot symbol. For each spin, each jackpot symbol is randomly replaced with one of a MAXI, MAJOR and MINI feature award symbols. Each jackpot symbol may be replaced by a different one of the feature award symbols. However, at least one of the virtual reel strips may include a plurality of adjacent jackpot symbols (or "stack"). The jackpot symbols in a stack may be replaced with the same feature award symbol. Each feature award symbol may be randomly upgraded to a jackpot symbol, i.e., a GOLDPOT jackpot symbol. In one embodiment, the feature award symbols may only be upgraded if the player's wager level is at or above a predetermined level, e.g., 150 or 200 credits. As discussed below each GOLDPOT jackpot symbol has the same function as the underlying or original feature award symbol, but may also trigger the GOLDPOT progressive jackpot award (see below). As discussed above, each of the feature awards, i.e., the MAXI, MAJOR and MINI feature awards are set amount, e.g., predetermined number of credits and the GOLDPOT progressive jackpot award is a progressive award.

In either an instance (or spin) of the primary game or a free game, five of the same feature award symbols or five GOLDPOT progressive jackpot symbols on the same payline trigger the respective award. For example, if a payline includes 5 MAXI feature award symbols, then the MAXI feature award is awarded to the player. Three, four or five mixed feature award or jackpot award symbols may results in a mixed pay award (see below).

In general, a Wild symbol may substitute for any other symbol. However, 5 Wild symbols cannot substitute for 5 feature award or jackpot award symbols. However, 4 Wild symbols and one feature award or jackpot award symbols (or any mixture of the same feature award or jackpot award symbols and Wild symbols), triggers a feature award or a jackpot award. Any mixed combination of feature award and jackpot award symbols and Wild symbols results in a mixed pay award (see below).

As discussed above, the GOLDPOT progressive pool is incremented in two ways. First, a percentage of each wager is added to the GOLDPOT progressive pool. In addition an amount is added to the GOLDPOT progressive pool when one of the feature awards is awarded to the player. More specifically, when one of the MAXI, MAJOR or MINI feature awards are awarded, the player receives the respective feature award and a percentage of the awarded feature award is added to the GOLDPOT progressive award. The percentage of the feature award added to the GOLDPOT progressive award may be the same for each feature award or may be different. The percentage of the feature award added to the GOLDPOT progressive award, may be fixed, e.g., 5%, or may be randomly determined.

For each instance of the game, more than one feature awards may be awarded to the player. For each feature award awarded to the player an amount may be added to the progressive pool.

In one aspect of the present invention, the player must wager at a minimum wager level to be eligible for the GOLDPOT jackpot. In the described embodiment, the player must wager at the 150 or 200 credit level to be eligible for the GOLDPOT jackpot. If the player has not wagered at the minimum wager level, then the feature award symbols are not randomly upgraded. However, if one or more of the feature awards are awarded to the player, a contribution is made to the GOLDPOT progressive pool, even if the player is not eligible for the GOLDPOT jackpot for that instance of the game.

The player is awarded the GOLDPOT jackpot in response to a GOLDPOT jackpot trigger being detected. The GOLDPOT jackpot may be 100% of the GOLDPOT jackpot pool, a predetermined percentage of the GOLDPOT jackpot pool or the entire GOLDPOT jackpot pool minus a predetermined amount. In the described embodiment, the GOLDPOT jackpot trigger is defined as the first (or leftmost) column of the grid 64 being filled with the GOLDPOT jackpot award symbol, i.e., an upgrade feature award symbol and all other cells 70 of the grid 64 contained a WILD symbol. It should be noted that the GOLDPOT jackpot trigger may be defined by other combinations of symbols in the outcome of the game. Alternatively, or in addition, the GOLDPOT jackpot may be awarded by a mystery trigger.

Under predefined conditions, a hybrid jackpot may be awarded to the player. For example, in the described embodiment, if a feature award, i.e., a MAXI, MAJOR or MINI award, is awarded to the player and the triggering condition, contains an upgraded feature award symbol, i.e., the GOLDPOT jackpot symbol, then in addition to the associated feature award, a percentage of the GOLDPOT jackpot pool is added to the award. For example, if the symbols: MINI feature award symbol; MINI feature award symbol; upgraded MINI feature award symbol; MINI feature award symbol; MINI feature award symbol, appeared on a payline of a primary or free game, then the MINI feature award plus a percentage of the GOLDPOT progressive pool would be awarded to the player. The percentage of the GOLDPOT progressive pool included in the award may be fixed or random.

With reference to FIGS. 15-18, in a second described embodiment, a game feature referred to as the "DIAMOND-IZER" game feature is provided. The DIAMOND-IZER game feature is provided along with a primary game. In the described embodiment, the primary game is a video slot machine game played on a 3×5 grid 64. The DIAMOND-IZER game feature includes (1) a free game feature, (2) an expanding wild feature, (3) 3 fixed amount feature award and (4) a progressive jackpot award. The progressive jackpot award is paid from a progressive pool. The progressive pool increased based on increments or contributions (see below). In the described embodiment, the progressive jackpot award is a stand-alone progressive, i.e., contributions to the progressive pool are made from one gaming machine and the progressive jackpot award may only be won from the same gaming machine. However, it should be noted that in other embodiment, the contributions to the progressive pool may be made from a plurality of connected gaming machines and the progressive jackpot award may be won from any one of the connected gaming machines.

In a first embodiment, the present invention provides a primary game. The primary game is a video slot game with nine paylines. The primary game includes a game feature that includes 4 feature awards: a "DIAMOND-IZER" progressive jackpot award, a "MAXI" jackpot or feature award, a "MAJOR" jackpot or feature award and a "MINI" jackpot or feature award. The DIAMOND-IZER progressive jackpot award is a progressive awards and as funded from a pool that increments as a function of wagers made by the player on the primary game and when the MAXI, MAJOR and MINI jackpot or feature awards are paid (see below). In the present embodiment, the player may choose a denomination, e.g., 1 cent, 2 cents and 5 cents denominations, as well as a bet level, e.g., 50, 75, 100, 150 and 200 credits. The value of a player's wager is based on the chosen denomination and bet level. For instance, if the player has chosen a denomination of 1 cent and a bet level of 50 credits, then the value of the player's wager is 50 cents. Likewise, if the player has chosen a denomination of 5 cents and a bet level of 200 credits, then the value of the player's wager is $10.00.

The MAXI, MAJOR and MINI feature awards are fixed value awards. However, the MAXI, MAJOR and MINI feature awards may be scaled as a function of bet level and/or denomination.

Figure 15:
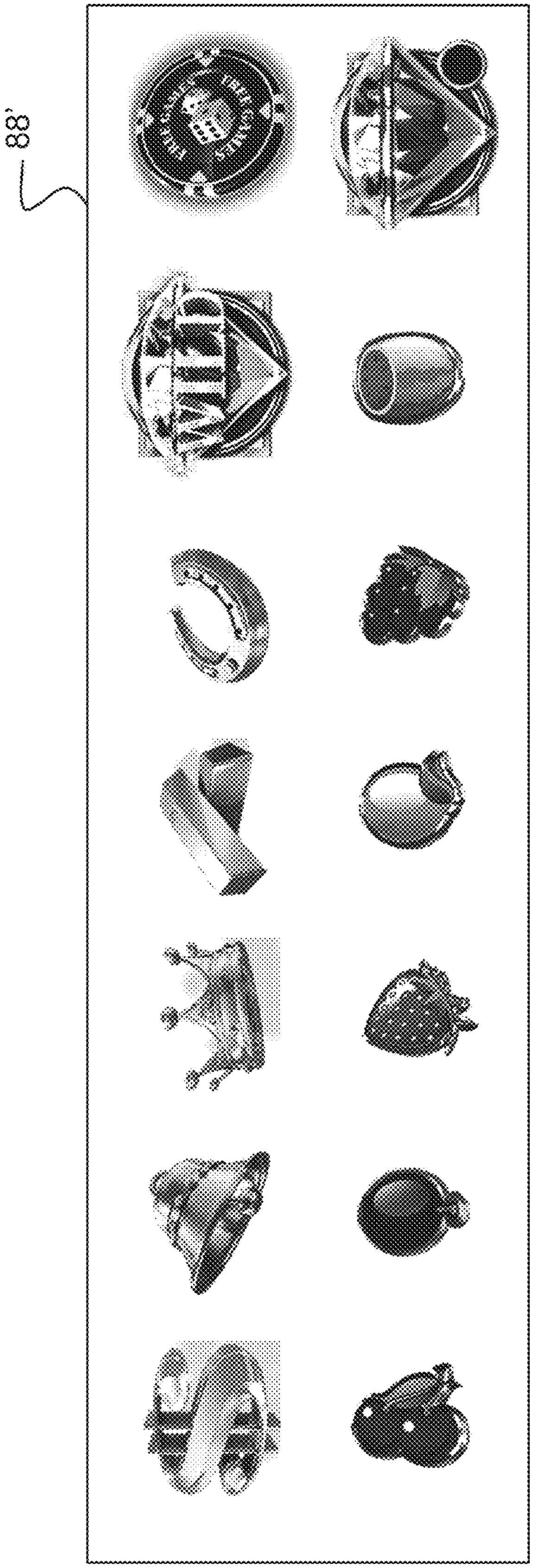
FIG. 15 is a figure showing the symbols displayed on the display area, according to another embodiment of the present invention.

The primary game is a video slot game that utilizes a 3×5 grid 68. The grid 68 includes a plurality of cells 70 arranged in 3 rows and 5 columns. Each column has an associated virtual reel or reel strip. Each reel strip has a number of symbol positions. Each symbol position is populated with a symbol from a set of symbols. In this embodiment, the set of symbol positions includes the following symbols: Wild; Scatter, Jackpot, PicA, PicB, PicC, PicD, PicE, A, K, Q, J, 10 and 9. An exemplary set of symbols 88' utilized in the primary game is shown in FIG. 15. In the top row from left, the symbols are shown as a dollar sign (PicA); a bell (PicB); crown (PicC); gold bars (PicD); a horse shoe (PicE); a Wild symbol and a Scatter symbol. In illustrated embodiment symbols 9-A are represented as fruit. In the bottom row from left, the symbols are shown: 9, 10, J, Q, K, A and a representative jackpot symbol.

Figure 16:
FIG. 16 is a graphical representation of an upgrade feature award symbol, according to an embodiment of the present invention.

For each instance or spin of the game, the jackpot symbol, is replaced with one of a MAXI, MAJOR and MINI jackpot symbols. In the illustrated embodiment, the MAXI jackpot symbol is red; the MAJOR jackpot symbol is blue and the MINI jackpot symbol is green. The MAXI, MAJOR and MINI jackpot symbols may be further distinguished with the text MAXI, MAJOR and MINI visible on top of the associated jackpot symbol. Each one of the jackpot symbols may be randomly upgraded to an upgraded jackpot symbol. In the illustrated embodiment, each jackpot symbol includes a socket. An image of a diamond is displayed in the socket to represent an upgraded jackpot symbols (FIG. 16).

In addition to the MAXI, MAJOR and MINI feature awards and the DIAMOND-IZER progressive jackpot award, the game feature includes a free game feature. The free game feature is triggered when a predetermined number of the Scatter symbol appear in the outcome of an instance of the primary game (or a free game). In the described embodiment, the number of free games awarded is a function of the number of Scatter symbols appearing in the outcome. For example, if three, four or five Scatter symbols appear in the outcome, eight, twelve and twenty free games may be awarded. In alternative embodiments, a fixed number of free games or a random number of free games may be awarded. The free games or spin may utilize different, i.e., alternative, virtual reel strips. In general, the alternative virtual reel strips used in the free games with include more jackpot symbols. Additional free games may be awarded during a free game.

Further, the game feature may include an expanding Wild feature. The expanding Wild feature may be provided in a primary game and free spins. In one aspect, one or more of the reels or columns of the grid 64 are "active" based on the bet level. As discussed above, in the described embodiment there are 5 bet levels: 50, 75, 100, 150 and 200. Based on the player's chosen bet levels, the following reels are "active":

50 credits: Reel 1,
75 credits: Reels 1-2,
100 credits: Reels 1-3,
150 credits: Reels 1-4, and
200 credits: Reels 1-5.

This is shown graphically in FIG. 17. The base bet, i.e., denomination, may be chosen by the player using a series of buttons on a button panel which may be provided as part of the interface unit 40. The player may also chose a bet level (50, 75, 100, 150 or 200 credits) using a separate series of buttons.

In a primary or free game, if a Wild symbol appears in a column of an active reel in an outcome of the primary or free game, the Wild symbol is expanded or copied into the other cells of the same column.

In either the primary game or a free game a virtual reel strip may be randomly replaced with an alternative reel strip with a different distribution of symbols.

It should be noted that the virtual reel strips include a plurality of cells populated with a jackpot symbol. For each spin, each jackpot symbol is randomly replaced with one of a MAXI, MAJOR and MINI feature award symbols. Each jackpot symbol may be replaced by a different one of the feature award symbols. However, at least one of the virtual reel strips may include a plurality of adjacent jackpot symbols (or "stack"). The jackpot symbols in a stack may be replaced with the same feature award symbol. Each feature award symbol may be randomly upgraded to a jackpot symbol, i.e., a DIAMOND-IZER jackpot symbol. In one embodiment, the feature award symbols may only be upgraded if the player's wager level is at or above a predetermined level, e.g., 150 or 200 credits. As discussed below each DIAMOND-IZER jackpot symbol has the same function as the underlying or original feature award symbol, but may also trigger the DIAMOND-IZER progressive jackpot award (see below). As discussed above, each of the feature awards, i.e., the MAXI, MAJOR and MINI feature awards are set amount, e.g., predetermined number of credits and the GOLDPOT progressive jackpot award is a progressive award.

In either an instance (or spin) of the primary game or a free game, five of the same feature award symbols or five DIAMOND-IZER progressive jackpot symbols on the same payline trigger the respective award. For example, if a payline includes 5 MAXI feature award symbols, then the MAXI feature award is awarded to the player. Three, four or five mixed feature award or jackpot award symbols may results in a mixed pay award (see below).

In general, a Wild symbol may substitute for any other symbol. However, 5 Wild symbols cannot substitute for 5 feature award or jackpot award symbols. However, 4 Wild symbols and one feature award or jackpot award symbols (or any mixture of the same feature award or jackpot award symbols and Wild symbols), triggers a feature award or a jackpot award. Any mixed combination of feature award and jackpot award symbols and Wild symbols results in a mixed pay award (see below).

As discussed above, the DIAMOND-IZER progressive pool is incremented in two ways. First, a percentage of each wager is added to the DIAMOND-IZER progressive pool. In addition, an amount is added to the DIAMOND-IZER progressive pool when one of the feature awards is awarded to the player. More specifically, when one of the MAXI, MAJOR or MINI feature awards are awarded, the player receives the respective feature award and a percentage of the awarded feature award is added to the DIAMOND-IZER progressive award. The percentage of the feature award added to the DIAMOND-IZER progressive award may be the same for each feature award or may be different. The percentage of the feature award added to the GOLDPOT progressive award, may be fixed, e.g., 5%, or may be randomly determined.

For each instance of the game, more than one feature awards may be awarded to the player. For each feature award awarded to the player an amount may be added to the progressive pool.

In one aspect of the present invention, the player must wager at a minimum wager level to be eligible for the DIAMOND-IZER jackpot. In the described embodiment, the player must wager at the 150 or 200 credit level to be eligible for the DIAMOND-IZER jackpot. If the player has not wagered at the minimum wager level, then the feature award symbols are not randomly upgraded. However, if one or more of the feature awards are awarded to the player, a contribution is made to the DIAMOND-IZER progressive pool, even if the player is not eligible for the DIAMOND-IZER jackpot for that instance of the game.

The player is awarded the DIAMOND-IZER jackpot in response to a DIAMOND-IZER jackpot trigger being detected. The DIAMOND-IZER jackpot may be 100% of the DIAMOND-IZER jackpot pool, a predetermined percentage of the DIAMOND-IZER jackpot pool or the entire DIAMOND-IZER jackpot pool minus a predetermined amount. In the described embodiment, the DIAMOND-IZER jackpot trigger is defined as the first (or leftmost) column of the grid 64 being filled with the DIAMOND-IZER jackpot award symbol, i.e., an upgrade feature award symbol and all other cells 70 of the grid 64 contained a WILD symbol. It should be noted that the DIAMOND-IZER jackpot trigger may be defined by other combinations of symbols in the outcome of the game. Alternatively, or in addition, the DIAMOND-IZER jackpot may be awarded by a mystery trigger.

Under predefined conditions, a hybrid jackpot may be awarded to the player. For example, in the described embodiment, if a feature award, i.e., a MAXI, MAJOR or MINI award, is awarded to the player and the triggering condition, contains an upgraded feature award symbol, i.e., the DIAMOND-IZER jackpot symbol, then in addition to the associated feature award, a percentage of the DIAMOND-IZER jackpot pool is added to the award. For example, if the symbols: MINI feature award symbol; MINI feature award symbol; upgraded MINI feature award symbol; MINI feature award symbol; MINI feature award symbol, appeared on a payline of a primary or free game, then the MINI feature award plus a percentage of the DIAMOND-IZER progressive pool would be awarded to the player. The percentage of the DIAMOND-IZER progressive pool included in the award may be fixed or random.

Figure 18:
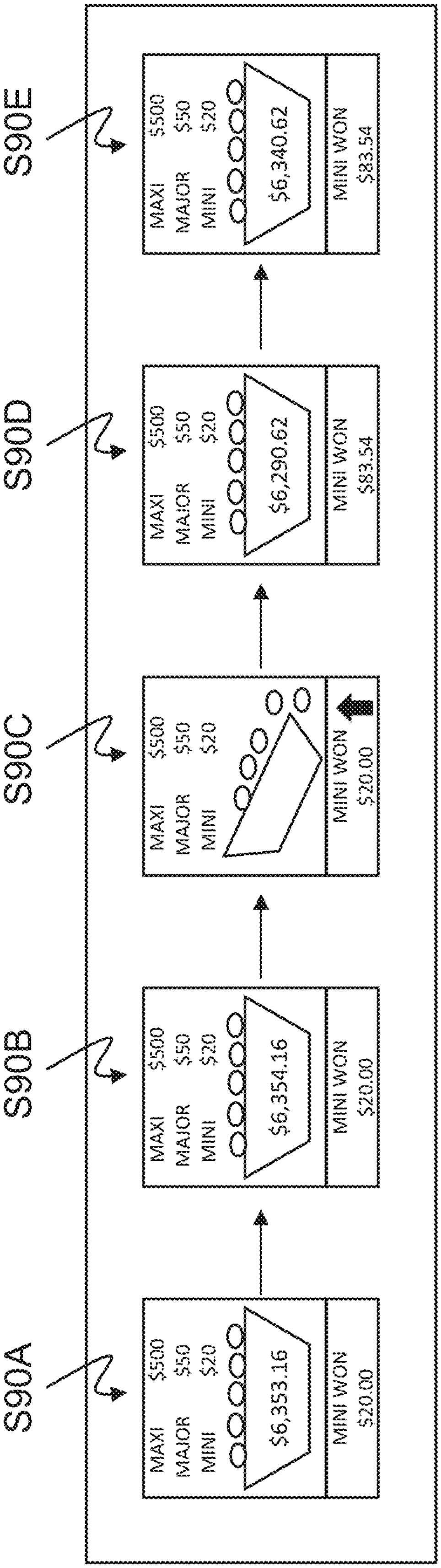
FIG. 18 is a graphical representation of a process for awarding a hybrid jackpot award, according to an embodiment of the present invention.

This is represented in graphically in FIG. 18. In this example in a first step S90A, in an outcome of the primary game or free spin, the following symbols appear on a payline: MINI feature award symbol; MINI feature award symbol; upgraded MINI feature award symbol; MINI feature award symbol; MINI feature award symbol. The MINI jackpot award is at $20 and the DIAMOND-IZER jackpot pool is at $6,353.16. In a second step S90B, the DIAMOND-IZER jackpot pool is incremented by a percentage of the awarded feature award, i.e., the MINI jackpot award. In this example, the percentage of the awarded feature award added to the jackpot pool is 5% of the awarded feature award awarded, or $1. Thus, the DIAMOND-IZER jackpot pool increments by $1 to $6,354.16. The player is then awarded the MINI jackpot ($20) in a third step S90C. In addition, since this is a hybrid win, the player is also awarded a random percentage of the DIAMOND-IZER jackpot pool (S90D). In this embodiment, the player is awarded 1%, (or $63.54) of the DIAMOND-IZER jackpot pool. Lastly, the DIAMOND-IZER jackpot pool is incremented by an amount to restore a base minimum level to the pool. For example, the DIAMOND-IZER jackpot pool has a base or reset value of $5,000. This means that $6,354.16 of the DIAMOND-IZER jackpot pool illustrated in step S90B consists of $5,000 of the reset value and $1,354.16 of accumulated increment value. In the event of a hybrid win, the player is awarded a percentage of the pool, i.e., the reset value and the increment value. In the case illustrated in S90C, 1% of the reset value (=$50.00) and 1% of the increment value (=$13.54) are awarded to the player. However, the portion that is deducted from the reset value is replenished and the reset value is maintained $5,000.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A gaming machine, comprising:

a gaming cabinet;

an operation unit mounted to the gaming cabinet, the operation unit including a touchscreen panel;

a display device mounted to the gaming cabinet; and a control unit operably coupled to the display device and the operation unit, the control unit including a processor programmed to execute an algorithm to display an animated sequence of computer-generated images on the display device including the steps of:

displaying a plurality of selectable button images on the touchscreen panel, each selectable button image associated with an active reel set;

displaying a game screen on the display device including a plurality of reels displayed within a grid, each reel displaying a plurality of game symbols;

rendering a jackpot feature award image on the game screen, the jackpot feature award image displaying a jackpot feature award pool including a reset value and an accumulated increment value;

receiving a player's selection of a button image via the touchscreen panel and establishing a corresponding active reel set based on the player's selection;

animating the plurality of reels to simulate the reels spinning and stopping to display the game symbols within the grid;

displaying a first feature award on the game screen upon detecting a special symbol appearing within the corresponding active reel set;

determining a contribution amount as a percentage of the first feature award;

increasing the jackpot feature award pool by adding the contribution amount to the accumulated increment value;

selecting a bonus award percentage;

determining a jackpot feature award value equal to the increased jackpot feature award pool multiplied by the selected bonus award percentage and awarding the jackpot feature award value;

reducing the jackpot feature award pool by the jackpot feature award value;

increasing the reduced jackpot feature award pool by an amount determined by multiplying the selected bonus award percentage and the reset value; and modifying the jackpot feature award image to display the increased jackpot feature award pool.

2. The gaming machine of claim 1, wherein the processor is programmed to execute the algorithm including the steps of:

determining a first portion of the jackpot feature award value by multiplying the selected bonus award percentage and the reset value;

determining a second portion of the jackpot feature award value by multiplying the selected bonus award percentage and the accumulated increment value; and determining the jackpot feature award value equal to the sum of the first portion and the second portion.

3. The gaming machine of claim 1, wherein the processor is programmed to execute the algorithm including the steps of:

randomly selecting the bonus award percentage.

4. The gaming machine of claim 1, wherein the processor is programmed to execute the algorithm including the steps of:

modifying a reel to include a jackpot symbol upon detecting a player's selection of a predefined active reel set.

5. A method of operating a gaming machine including an operation unit mounted to a gaming cabinet and including a touchscreen panel, a display device mounted to the gaming cabinet, and a control unit including a processor operably coupled to the touchscreen panel and the display device, the method including the processor performing an algorithm to display an animated sequence of computer-generated images on the display including the steps of:

displaying a plurality of selectable button images on the touchscreen panel, each selectable button image associated with an active reel set;

displaying a game screen on the display device including a plurality of reels displayed within a grid, each reel displaying a plurality of game symbols;

rendering a jackpot feature award image on the game screen, the jackpot feature award image displaying a jackpot feature award pool including a reset value and an accumulated increment value;

receiving a player's selection of a button image via the touchscreen panel and establishing a corresponding active reel set based on the player's selection;

animating the plurality of reels to simulate the reels spinning and stopping to display the game symbols within the grid;

displaying a first feature award on the game screen upon detecting a special symbol appearing within the corresponding active reel set;

determining a contribution amount as a percentage of the first feature award;

increasing the jackpot feature award pool by adding the contribution amount to the accumulated increment value;

selecting a bonus award percentage;

determining a jackpot feature award value equal to the increased jackpot feature award pool multiplied by the selected bonus award percentage and awarding the jackpot feature award value;

reducing the jackpot feature award pool by the jackpot feature award value;

increasing the reduced jackpot feature award pool by an amount determined by multiplying the selected bonus award percentage and the reset value; and modifying the jackpot feature award image to display the increased jackpot feature award pool.

6. The method of claim 5, including the processor performing the algorithm steps of:

determining a first portion of the jackpot feature award value by multiplying the selected bonus award percentage and the reset value;

determining a second portion of the jackpot feature award value by multiplying the selected bonus award percentage and the accumulated increment value; and determining the jackpot feature award value equal to the sum of the first portion and the second portion.

7. The method of claim 5, including the processor performing the algorithm steps of:

randomly selecting the bonus award percentage.

8. The method of claim 5, including the processor performing the algorithm steps of:

modifying a reel to include a jackpot symbol upon detecting a player's selection of a predefined active reel set.

9. A non-transitory computer-readable storage media having computer-executable instructions embodied thereon to operate a gaming machine including an operation unit including a touchscreen panel, a display device, and a processor operably coupled to the touchscreen panel and the display device, when executed by the processor the computer-executable instructions cause the processor to perform an algorithm to display an animated sequence of computer-generated images on the display including the steps of:

displaying a plurality of selectable button images on the touchscreen panel, each selectable button image associated with an active reel set;

displaying a game screen on the display device including a plurality of reels displayed within a grid, each reel displaying a plurality of game symbols;

rendering a jackpot feature award image on the game screen, the jackpot feature award image displaying a jackpot feature award pool including a reset value and an accumulated increment value;

receiving a player's selection of a button image via the touchscreen panel and establishing a corresponding active reel set based on the player's selection;

animating the plurality of reels to simulate the reels spinning and stopping to display the game symbols within the grid;

displaying a first feature award on the game screen upon detecting a special symbol appearing within the corresponding active reel set;

determining a contribution amount as a percentage of the first feature award;

increasing the jackpot feature award pool by adding the contribution amount to the accumulated increment value;

selecting a bonus award percentage;

determining a jackpot feature award value equal to the increased jackpot feature award pool multiplied by the selected bonus award percentage and awarding the jackpot feature award value;

reducing the jackpot feature award pool by the jackpot feature award value;

increasing the reduced jackpot feature award pool by an amount determined by multiplying the selected bonus award percentage and the reset value; and modifying the jackpot feature award image to display the increased jackpot feature award pool.

10. The non-transitory computer-readable storage media of claim 9, wherein the computer-executable instructions cause the processor to perform the algorithm including the steps of:

determining a first portion of the jackpot feature award value by multiplying the selected bonus award percentage and the reset value;

determining a second portion of the jackpot feature award value by multiplying the selected bonus award percentage and the accumulated increment value; and determining the jackpot feature award value equal to the sum of the first portion and the second portion.

11. The non-transitory computer-readable storage media of claim 9, wherein the computer-executable instructions cause the processor to perform the algorithm including the steps of:

modifying a reel to include a jackpot symbol upon detecting a player's selection of a predefined active reel set.

* * * * *